US007801491B2

(12) United States Patent
Hatakeyama et al.

(10) Patent No.: US 7,801,491 B2
(45) Date of Patent: *Sep. 21, 2010

(54) WIRELESS COMMUNICATION SYSTEM AND METHOD

(75) Inventors: Shigeru Hatakeyama, Tokyo (JP); Shigeru Yamazaki, Tokyo (JP); Hiroki Murayama, Tokyo (JP); Koichi Hirano, Tokyo (JP)

(73) Assignee: NEC Corporation, Tokyo (JP)

( * ) Notice: Subject to any disclaimer, the term of this patent is extended or adjusted under 35 U.S.C. 154(b) by 755 days.

This patent is subject to a terminal disclaimer.

(21) Appl. No.: 11/520,852

(22) Filed: Sep. 14, 2006

(65) Prior Publication Data

US 2007/0063908 A1 Mar. 22, 2007

(30) Foreign Application Priority Data

Sep. 16, 2005 (JP) ............................ 2005-271187

(51) Int. Cl.
*H04B 7/00* (2006.01)
*H01Q 19/10* (2006.01)

(52) U.S. Cl. ......................... 455/68; 343/755; 343/834; 343/837

(58) Field of Classification Search ....................... None
See application file for complete search history.

(56) References Cited

U.S. PATENT DOCUMENTS 6,320,509 B1 * 11/2001 Brady et al. ............. 340/572.7
2005/0012613 A1 * 1/2005 Eckstein et al. ........ 340/539.13
2005/0156806 A1 7/2005 Ohta et al.
2005/0159187 A1 * 7/2005 Mendolia et al. ......... 455/562.1
2007/0013482 A1 * 1/2007 Kato et al. ................. 340/10.1

FOREIGN PATENT DOCUMENTS

| | | |
|---|---|---|
| JP | 2000-324063 A | 11/2000 |
| JP | 2003-249872 A | 9/2003 |
| JP | 2003-283365 A | 10/2003 |
| JP | 2004-094556 A | 3/2004 |
| JP | 2004-265112 A | 9/2004 |
| JP | 2005-004532 A | 1/2005 |
| JP | 2005-005876 A | 1/2005 |
| JP | 2005-192030 A | 7/2005 |
| JP | 2006-252181 A | 9/2006 |

OTHER PUBLICATIONS

English translation of the Japanese Patent Publication JP2004-265112.*

* cited by examiner

*Primary Examiner*—Matthew D Anderson
*Assistant Examiner*—Gennadiy Tsvey
(74) *Attorney, Agent, or Firm*—Foley & Lardner LLP

(57) ABSTRACT

A wireless communication system includes: a main antenna for radiating an electromagnetic wave to wireless IC chips; a reflecting plate for reflecting the electromagnetic wave from the main antenna to the wireless IC chips; and a control unit which supports the wireless IC chips. The control unit causes a difference between the receiving electromagnetic wave levels of a direct wave from the main antenna and a reflected wave from the reflecting plate received by the antenna of the wireless IC chip.

11 Claims, 14 Drawing Sheets

FIG. 10

| | | INITIAL STATE (FIG.2) | | AFTER RECEIVING ELECTROMAGNETIC WAVE LEVEL IS CONTROLLED (90° CLOCKWISE ROTATION ; FIG.4) | |
|---|---|---|---|---|---|
| | | ELECTROMAGNETIC WAVE TYPE | | ELECTROMAGNETIC WAVE TYPE | |
| ANTENNA TYPE | | DIRECT WAVE | REFLECTED WAVE | DIRECT WAVE | REFLECTED WAVE |
| FLAT ANTENNA CONTROL OBJECT : RECEPTION EFFECTIVE AREA | | 0.7 | 0.7 | 0.7 | 0 |
| MONOPOLE ANTENNA CONTROL OBJECT : RECEPTION EFFECTIVE LENGTH | HORIZONTAL STATE | 1 | 1 | 1 | 0 |
| | VERTIAL STATE | 0.7 | 0.7 | 0.7 | 1 |
| DIPOLE ANTENNA CONTROL OBJECT : RECEPTION EFFECTIVE LENGTH | HORIZONTAL STATE | 1 | 1 | 1 | 0 |
| | VERTIAL STATE | 0.7 | 0.7 | 0.7 | 1 |
| TURNSTILE ANTENNA CONTROL OBJECT : RECEPTION EFFECTIVE LENGTH | | 1.7 | 1.7 | 1.7 | 1 |

FIG. 11

| | | INITIAL STATE (FIG.6) | | AFTER RECEIVING ELECTROMAGNETIC WAVE LEVEL IS CONTROLLED (90° CLOCKWISE ROTATION ; FIG.8) | |
|---|---|---|---|---|---|
| | | ELECTROMAGNETIC WAVE TYPE | | ELECTROMAGNETIC WAVE TYPE | |
| ANTENNA TYPE | | DIRECT WAVE | REFLECTED WAVE | DIRECT WAVE | REFLECTED WAVE |
| FLAT ANTENNA CONTROL OBJECT : RECEPTION EFFECTIVE AREA | | 0 | 0 | 0 | 1 |
| MONOPOLE ANTENNA CONTROL OBJECT : RECEPTION EFFECTIVE LENGTH | HORIZONTAL STATE | 1 | 1 | 1 | 1 |
| | VERTIAL STATE | 0 | 0 | 0 | 1 |
| DIPOLE ANTENNA CONTROL OBJECT : RECEPTION EFFECTIVE LENGTH | HORIZONTAL STATE | 1 | 1 | 1 | 1 |
| | VERTIAL STATE | 0 | 0 | 0 | 1 |
| TURNSTILE ANTENNA CONTROL OBJECT : RECEPTION EFFECTIVE LENGTH | | 1 | 1 | 1 | 2 |

WIRELESS COMMUNICATION SYSTEM AND METHOD

BACKGROUND OF THE INVENTION

1. Field of the Invention

The present invention relates to a wireless communication system and a wireless communication method for performing read/write communications between wireless IC chips provided to a plurality of articles piled up three-dimensionally on a dolly passing through a passage or a production line.

2. Description of Related Art

A wireless communication system, in which an electromagnetic wave from an antenna is radiated to RFID tags attached to a plurality of articles piled up three-dimensionally on a dolly passing through a passage or a production line so as to perform read/write communications between the RFID tags attached to the articles, has been developed.

In the wireless communication system, various methods are adopted to make an electromagnetic wave from an antenna arrive at RFID tags of a plurality of articles piled up three-dimensionally on a dolly. The methods will be described.

Japanese Patent Laid-Open Publication No. 2005-5876 discloses a configuration including an antenna for irradiating a recognition area with an inquiry electromagnetic wave and a reflecting plate arranged opposite thereto to thereby extend the recognition area. Japanese Patent Laid-Open Publication No. 2005-4532 discloses a configuration in which a plurality of antennas are arranged circumferentially around a turntable mounting a wireless data carrier. Japanese Patent Laid-Open Publication No. 2004-265112 discloses a configuration in which a plurality of antennas are arranged in a height direction around an article mounting part. Japanese Patent Laid-Open Publication No. 2005-192030 discloses a configuration in which an antenna is arranged in a space to be detected, and the space is scanned by the antenna.

It is true that the wireless communication systems disclosed in the above-mentioned patent documents are capable of effectively guiding the direct electromagnetic waves from the antennas or the electromagnetic waves reflected by the reflection plates to the RFID tags of the articles through utilizing the positional relation between the plurality of antennas and the reflection plates.

However, when using a plurality of antennas, or using reflecting plates, interference may be caused between electromagnetic waves directly arrived at the RFID tags from the antennas and electromagnetic waves reflected at the reflecting plates, depending on the directions of antenna faces of the RFID tags with respect to the radiating direction of the electromagnetic waves from the antennas, so there is a case where the both of the direct and reflected electromagnetic waves cannot be made incident on the RFID tags effectively. If such a phenomenon is caused, the RFID tags cannot decode data signals transmitted from antennas by electromagnetic waves, whereby read/write communications cannot be performed.

SUMMARY OF THE INVENTION

It is therefore an object of the present invention to provide a wireless communication system and a wireless communication method capable of performing read/write communications securely while preventing interference between an electromagnetic wave arrived directly from an antenna and an electromagnetic wave reflected at a reflecting plate.

In order to achieve the above-mentioned object, a wireless communication system according to the present invention comprises: a main antenna for radiating an electromagnetic wave to wireless IC chips; a reflecting plate for reflecting the electromagnetic wave from the main antenna to the wireless IC chips; and a control unit which supports the wireless IC chips. The control unit has a function of causing a difference between receiving electromagnetic wave levels of a direct wave from the main antenna and a reflected wave from the reflecting plate, received by the antenna of a wireless IC chip.

When observed from the wireless IC chip side, the direct wave from the main antenna and the reflected wave from the reflecting plate may be made incident on the antenna of the wireless IC chip almost simultaneously or with a phase shift.

The control unit of the present invention causes a difference between receiving electromagnetic wave levels of a direct wave from the antenna and a reflected wave from a reflecting plate received by the antenna of a wireless IC chip. Therefore, even if the direct wave from the main antenna and the reflected wave from the reflecting plate are made incident on an antenna of a wireless IC chip, a difference is caused between the receiving electromagnetic wave levels for receiving the both electromagnetic waves, so interference is not caused between the both electromagnetic waves or interference is suppressed.

Therefore, one of the electromagnetic wave as the direct wave from the main antenna and the electromagnetic wave as the reflected wave from the reflecting plate is made incident on the antenna of the wireless IC chip. Therefore, a passage of an electromagnetic wave is formed between the main antenna and the wireless IC chip without fail, so data communications by the electromagnetic wave are performed between the both without fail.

In order to control the receiving electromagnetic wave levels by the control unit, the following configuration may be accepted. That is, the control unit controls a reception effective length with respect to an electromagnetic wave of the antenna of the wireless IC chip to thereby cause a difference between the receiving electromagnetic wave levels of the direct wave from the main antenna and the reflected wave from the reflecting plate received by the antenna of the wireless IC chip, or the control unit controls a reception effective area with respect to an electromagnetic wave of the antenna of the wireless IC chip to thereby cause a difference between the receiving electromagnetic wave levels of the direct wave from the main antenna and the reflected wave from the reflecting plate received by the antenna of the wireless IC chip.

Further, it is also accepted that the control unit supports various wireless IC chips having different types of antennas, and by controlling a reception effective length or a reception effective area with respect to the electromagnetic wave corresponding to the type of the antenna of a wireless IC chip, the control unit causes a difference between the receiving electromagnetic wave levels of the direct wave from the main antenna and the reflected wave from the reflecting plate received by the antenna of the wireless IC chip.

The receiving electromagnetic wave level for receiving the electromagnetic wave from the main antenna can be controlled by changing the reception effective length or the reception effective area of the antenna of the wireless IC chip for the main antenna, with respect to the direct wave from the antenna and the reflecting wave from the reflecting plate.

In view of the above, in the present invention, the reception effective length or the reception effective area of the antenna of the wireless IC chip for the main antenna is changed with respect to the direct wave from the antenna and the reflecting wave from the reflecting plate, whereby a difference is caused between the receiving electromagnetic wave levels.

As described above, even if the direct wave from the main antenna and the reflected wave from the reflecting plate are made incident on the antenna of the wireless IC tag almost simultaneously or with a phase shift, interference between the both electromagnetic waves is attenuated or suppressed due to a level difference caused between the receiving electromagnetic wave levels.

Further, in changing the reception effective length or the reception effective area of the antenna of the wireless IC chip for the main antenna with respect to the direct wave from the main antenna and the reflected wave from the reflecting plate, it is only necessary to cause a difference between the receiving electromagnetic wave levels by angularly rotating the wireless IC chip within a reception area of the direct wave and the reflected wave by the control unit.

An electromagnetic wave radiated from the main antenna to the antennas of wireless IC chips is not limited specifically, but by using a circularly polarized electromagnetic wave, it is possible to transmit data signals securely to the wireless IC chips attached to articles piled up three-dimensionally, for example.

Although the case of constructing the present invention as a wireless communication system has been explained in the above-described example, the present invention is not limited to this configuration. That is, the present invention may be constructed as a wireless communication method.

A wireless communication method, based on the above-described concept, is constructed to include the steps of: radiating an electromagnetic wave in which electromagnetic wave passages, to a wireless IC chip, of an electromagnetic wave radiated from an main antenna and an electromagnetic wave reflected at a reflecting plate are formed; and controlling levels so as to cause a difference between the receiving electromagnetic wave levels of the direct wave from the main antenna and the reflected wave from the reflecting plate received by the antenna of the wireless IC chip, in a reception area of the direct wave and the reflected wave of the electromagnetic wave.

In the level controlling step, the following configuration is accepted to control the receiving electromagnetic wave levels. That is, by controlling a reception effective length with respect to an electromagnetic wave of the antenna of the wireless IC chip in the level controlling step, a difference is caused between the receiving electromagnetic wave levels of the direct wave from the main antenna and the reflected wave from the reflecting plate, received by the antenna of the wireless IC chip. Alternatively, by controlling a reception effective area with respect to an electromagnetic wave of the antenna of the wireless IC chip in the level controlling step, a difference is caused between the receiving electromagnetic waves of the direct wave from the main antenna and the reflected wave from the reflecting plate received by the antenna of the wireless IC chip.

Further, in the level controlling step, by controlling a reception effective length or a reception effective area with respect to an electromagnetic wave corresponding to the type of the antenna of the wireless IC chip, a difference is caused between the receiving electromagnetic wave levels of the direct wave from the main antenna and the reflected wave from the reflecting plate received by the antenna of the wireless IC chip.

According to the method of the present invention, a difference is caused between receiving electromagnetic wave levels by changing a reception effective length or the reception effective area of the antenna of the wireless IC chip for the main antenna, with respect to the direct wave from the antenna and the reflected wave from the reflecting plate.

As described above, even if the direct wave from the main antenna and the reflected wave from the reflecting plate are made incident on the antenna of the wireless IC tag almost simultaneously or with a phase shift, interference between the both electromagnetic waves may be attenuated or suppressed due to the level difference caused between the receiving electromagnetic wave levels.

EFFECTS OF THE INVENTION

As described above, according to the present invention, a difference is caused between receiving electromagnetic wave levels by changing a reception effective length or a reception effective area of the antenna of a wireless IC chip for the main antenna, with respect to the direct wave from the main antenna and the reflected wave from the reflecting plate. Therefore, even if the direct wave from the main antenna and the reflected wave from the reflecting plate are made incident on the antenna of the wireless IC tag almost simultaneously or with a phase shift, interference between the both electromagnetic waves can be attenuated or suppressed due to the level difference between the receiving electromagnetic wave levels. As a result, read/write communications can be established securely between the main antenna and the wireless IC chip.

BRIEF DESCRIPTION OF THE DRAWINGS

FIG. 10 is a table showing reception effective areas and reception effective lengths of the respective antennas in the states shown in FIGS. 2 and 4;

FIG. 11 is a table showing reception effective areas and reception effective lengths of the respective antennas in the states shown in FIGS. 6 and 8;

DESCRIPTION OF THE PREFERRED EMBODIMENTS

Figure 1:
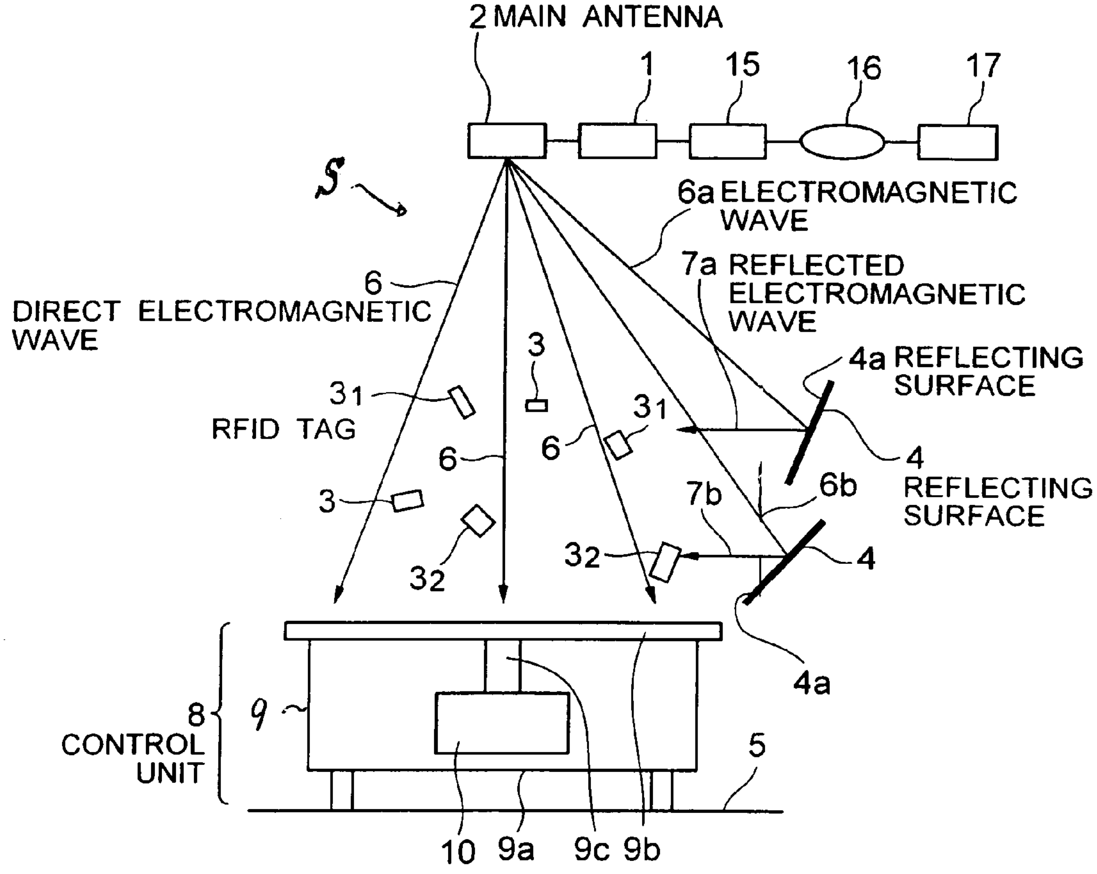
FIG. 1 is a configuration diagram showing a wireless communication system according to an embodiment 1.

Hereinafter, embodiments of the present invention will be described in detail based on the drawings.

A wireless communication system according to the embodiments of the present invention includes, as the basic configuration, a main antenna 2 which radiates an electromagnetic wave to wireless IC chips (3), reflecting plates 4 which reflect the electromagnetic wave from the main antenna 2 to the wireless IC chips (3), and a control unit 8 which supports the wireless IC chips (3). The control unit 8 has a function of causing a difference between the receiving electromagnetic wave levels of a direct wave from the main antenna 2 and a reflected wave from the reflecting plate 4, received by an antenna of a wireless IC chip (3).

The main antenna 2 radiates an electromagnetic wave, outputted from a transmitting/receiving device (1), to the wireless IC chips (3). Embodiments of the present invention will be described specifically based on an example in which RFID tags 3 are used as wireless IC chips and a reader/writer for managing the RFID tags 3 is used as the transmitting/receiving device. An RFID tag includes an antenna and a memory. The reader/writer 1 has a function of reading information from the RFID tags 3 and writing information to the RFID tags with electromagnetic waves, and the reader/writer 1 performs transmission and reception of data signal using electromagnetic waves with the RFID tags 3 by the main antenna 2. These RFID tags and the reader/writer used herein are of the general-purpose types.

Embodiment 1

FIG. 1 shows an embodiment 1 of the present invention. As shown in FIG. 1, articles provided with the RFID tags 3 are collected within a management area 5 by being piled up on a dolly 9. The management area 5 may be a store or a warehouse in a distribution process, or a passage of a store or a part passing through a production line. In other words, the management area 5 means a space where a plurality of RFID tags 3 attached to articles or the like are collected. In FIG. 1, articles to which the RFID tags 3 are attached are not shown, and only the RFID tags 3 attached to articles on the dolly 9 are shown.

On the upper part of the management area 5, that is, on the ceiling of a factory for example, the main antenna 2 of the reader/writer 1 is provided downward such that the traveling direction 6 of an electromagnetic wave runs toward the management area 5 so as to cover the almost all parts of the area. Note that arrow lines drawn from the main antenna of the reader/writer 1 shows electromagnetic waves and their radiated directions. The reference numeral 6 shows an image of a direct electromagnetic wave (hereinafter referred to as a direct wave) radiated from the main antenna 2 to the RFID tag 3. Reference numerals 6*a* and 6*b* show images of reflected electromagnetic waves outputted from the main antenna 2 and reflected at reflecting plates 4 described later to the RFID tag 3 side.

The reader/writer 1 is connected with a computer terminal 15, and information is exchanged between the reader/writer 1 and the computer terminal 15. Further, the computer terminal 15 is connected with a server 17 over a network 16. Information from the computer terminal 15 is accumulated in the server 17, and the information is outputted from the server 17 to the computer terminal 15 over the network 16. The server 17 organizes the information inputted from the reader/writer 1 into a database, and maintains the information so as to be usable in the goods management of a store, production management of a factory and the like.

The plurality of reflecting plates 4 reflect electromagnetic waves from the main antenna 2 of the reader/writer 1 and advance them to the RFID tags 3 in the management area 5. Each of the reflecting plates 4 is so configured that the a reflecting surface 4*a* is formed on a surface to which an electromagnetic wave is made incident by metal finishing or applying an electromagnetic-reflecting agent so as to reflect the electromagnetic wave at the reflecting surface 4*a*. In the embodiment shown in FIG. 1, the reflecting plates 4 are arranged in two upper and lower stages in a vertical direction. Note that the number of arranged stages of the reflecting plates 4 is not limited to two. The number of arranged stages of the reflecting plates 4 changes depending on the piled height of the RFID tags 3 piled up on the dolly 9. For example, if the width of the reflecting plate 4 is narrow, the number of arranged stages of the reflecting plates 4 is large, and if the piled height of the RFID tags 3 piled up on the dolly 9 is high, the number of arranged stages of the reflecting plates 4 is large.

The plurality of reflecting plates 4 are arranged in multiple stages, and the reflecting surfaces 4*a* thereof are held in tilted postures. The tilt angles of the reflecting surfaces 4*a* are set such that the electromagnetic waves 6*a* and 6*b* radiated from the main antenna 2 in directions of the respective reflecting plates 4 are reflected almost horizontally at the reflecting surfaces 4*a* and the reflected electromagnetic waves 7*a* and 7*b* (hereinafter referred to as reflected waves) are advanced to the RFID tags 3 piled up three-dimensionally in the management area 5.

The tilt angle of the reflecting plate 4 is changed depending on the position where the electromagnetic wave from the main antenna 2 is made incident. In the example shown in FIG. 1, the tilt angle of a reflecting plate 4 for reflecting the electromagnetic wave 7*a* toward an RFIF tag $\mathbf{3}_1$, positioned in the upper stage, is set to be small, and the tilt angle of a reflecting plate 4 for reflecting the electromagnetic wave 7*b* toward an RFIF tag $\mathbf{3}_2$, positioned in the lower stage, is set to be large. Note that the tilt angles of the reflecting plates 4 are examples, so they may be selected appropriately by taking statistics of antenna directions of the RFID tags 3 collected in the management area 5, or according to the empirical rules. In other words, it is only necessary that electromagnetic waves from the main antenna 2 of the reader/writer 1 can arrive at the antennas of all RFID tags 3 collected in the collection space S by using the reflecting plates 4 having the reflecting surfaces 4*a*, irrespective of the antenna directions of the RFID tags 3. Further, if the width of the reflecting plate 4*a* is in the same length of the wavelength of an electromagnetic wave or a length of ¾ or ²⁄₁ of the wavelength, resonance phenomenon of the electromagnetic wave is caused on the reflecting surface 4*a* and attenuated, whereby the power of the reflected waves 7*a* and 7*b* is lowered. Therefore, the width of the reflecting plate 4 is set to be not less than the wavelength of the electromagnetic wave.

Further, the reflecting surface 4*a* of the reflecting plate 4 is formed in a shape of plane, two-dimensional parabolic face, cylindrical face, elliptical face or the like. If the shape of the reflecting surface 4*a* is a two-dimensional parabolic face, a cylindrical face, an elliptical face or the like, it is possible to suppress diffusion of the reflected wave from the reflecting surface 4*a* at minimum, compared with a reflecting surface 4*a* of a plane shape. Further, if the reflecting surface 4*a* is a two-dimensional parabolic face dished inward, a reflected wave shows a parallel irradiation characteristic. If the reflecting surface 4*a* is a cylindrical face or an elliptical face dented inward, the reflected wave shows a condensing irradiation characteristic. The reflecting surface 4*a* may be in a shape of two-dimensional parabolic face, cylindrical face, elliptical face or the like protruded outwardly, depending on the cases.

Now, the relationship between the reader/writer 1 and the RFID tag 3 will be explained. The electromagnetic waves 6*a* and 6*b* outputted from the main antenna 2 of the reader/writer 1 are assumed to be radiated with an almost fan-like directional characteristic. In this case, due to the positional relationship between the electromagnetic waves 6*a* and 6*b* and the antennas of the RFID tags 3, there is a case where the antennas of the RFID tags 3 cannot receive the electromagnetic waves.

Specifically, since the antennas of the RFID tags 3 are postured appropriate for receiving the electromagnetic wave from the main antenna 2 of the reader/writer 1 in FIG. 1, the RFID tags 3 are in a state capable of receiving the direct wave 6 from the main antenna 2. On the other hand, since the RFID tags $3_1$ and $3_2$ are postured such that the antennas thereof are in parallel with the advancing direction of the electromagnetic wave from the main antenna 2 of the reader/writer 1 or in a state where the electromagnetic wave is shielded by the RFID tag bodies, they cannot receive the direct wave 6 from the main antenna 2 of the reader/writer 1 with the antennas or the receiving levels thereof are lowered.

In view of the above, in the present embodiment, when information is transmitted or received between the RFID tag 3 and the reader/writer 1, the electromagnetic waves 6*a* and 6*b* radiated in directions from the main antenna 2 to the respective reflecting plates 4 are reflected at the reflecting surfaces 4*a* almost horizontally, and the reflected waves 7*a* and 7*b* are advanced to the RFID tags $3_1$ and $3_2$ piled up three-dimensionally within the management area 5.

The control unit 8 has a function of causing a difference between receiving electromagnetic wave levels of the direct wave 6 from the main antenna 2 and the reflected wave 7*a* from the reflecting plate 4 received by the antenna of the RFID tag 3 supported by the control unit 8.

As the antenna provided to the RFID tag 3, an antenna of a general-purpose structure such as a flat antenna, a dipole antenna, a monopole antenna or a turnstile antenna is used. A turnstile antenna is an antenna in which two dipole antennas are combined in a positional relationship of 90 degrees to each other. Communications from the main antenna 2 to the antenna of the RFID tag 3 are performed by using a circularly polarized wave. When the antenna of the RFID tag 3 receives an electromagnetic wave, it can receive either of the clockwise-turning and counterclockwise-turning circularly polarized waves.

If the antenna of the RFID tag 3 is a dipole antenna, a monopole antenna or a turnstile antenna, it can receive electromagnetic waves from front and back surface directions and from side surface directions of the RFID tag 3. If the antenna of the RFID tag 3 is a flat antenna, it can receive electromagnetic waves from front and back surfaces directions of the RFID tag 3. In the case of a flat antenna, the receiving electromagnetic wave level changes depending on the size of the reception effective area with respect to the electromagnetic wave radiated from the main antenna 2. In the case of a dipole antenna, monopole antenna or a turnstile antenna, the receiving electromagnetic wave level changes depending on the reception effective length with respect to the electromagnetic wave radiated from the main antenna 2.

Although a dipole antenna, a monopole antenna and a turnstile antenna are mentioned as examples of an antenna in which the receiving electromagnetic wave level with respect to an electromagnetic wave radiated from the main antenna 2 changes depending on a change in the effective reception length, it is not limited to them. Further, although a flat antenna is mentioned as an example of an antenna in which the receiving electromagnetic wave level with respect to an electromagnetic wave radiated from the main antenna 2 changes depending on a change in the effective reception area, it is not limited to this. Flat antennas include a slot antenna, a patch antenna and a spiral antenna.

In the case where the antenna of the RFID tag 3 is a dipole antenna, monopole antenna, a turnstile antenna or the like, the control unit 8 causes a difference between the receiving electromagnetic wave levels of the direct wave 6 from the main antenna 2 and the reflected waves 7*a* and 7*b* from the reflecting plates 4 received by the antennas of the RFID tags 3, by controlling the reception effective length with respect to the electromagnetic wave of the antenna of the RFID tag 3. If the antenna of the RFID tag 3 is a flat antenna or the like, the control unit 8 causes a difference between the receiving electromagnetic wave levels of the direct wave 6 from the main antenna 2 and the reflected waves 7*a* and 7*b* from the reflecting plates 4 received by the antennas of the RFID tags 3 by controlling the reception effective area with respect to the electromagnetic wave of the antenna of the RFID tag 3.

Further, in the case where dipole antennas, monopole antennas, turnstile antennas are combined as the RFID tags 3, a difference is caused between the receiving electromagnetic wave levels of the direct wave 6 from the main antenna 2 and the reflected waves 7*a* and 7*b* from the reflecting plates 4 received by the antennas of the RFID tags 3, by controlling the reception effective length and the reception effective area with respect to the electromagnetic wave corresponding to the types of the antennas of the RFID tags 3.

In the present embodiment, the control unit 8 is formed of the dolly 9 used for conveying articles and the like. This will be described specifically. As shown in FIG. 1, the dolly 9 constituting the control unit 8 includes a vehicle body 9*a* for moving articles mounted thereon, a top plate 9*b* for supporting the articles, and a power source 10 for rotational driving.

The top plate 9*b* is supported to be angularly rotatable around the rotary shaft 9*c* on top of the vehicle body 9*a*, and is adapted such that articles provided with the RFID tags 3 are mounted three-dimensionally thereon. The driving source 10 is so formed that the output shaft (not shown in the figures) thereof is connected with the rotary shaft 9*c* of the top plate 9*b*. The driving source 10 is controlled based on an instruction from the server 17 so as to angularly rotate the top plate 9*b*.

When the vehicle body 9*a* enters the management area 5, the driving source 10 angularly rotates the top plate 9*b* so as to control the reception effective length and the reception effective area with respect to the electromagnetic waves of the antennas of the RFID tags 3 to thereby cause a difference between the receiving electromagnetic wave levels of the direct wave 6 from the main antenna 3 and the reflected waves 7*a* and 7*b* from the reflecting plates 4*a* and 4*b*.

Next, operation of the wireless communication system according to the embodiment of the present invention will be described. The RFID tag 3 is attached to an article to be identified. Then, to the RFID tag 3, information required for identifying the article is written by using an information writing device not shown. The RFID tag 3 in which the information is written is conveyed into the collection space S together with the article, and a plurality of RFID tags 3 are collected in the space S.

Articles with the RFID tags 3 are to be piled up on a dolly in up and down and conveyed to the management area 5 in the collection space S. In the process of conveying the articles into the management area 5, antenna directions of the RFID tags 3 will not be managed, so directions of the antennas face random directions actually.

In the management area 5 where a plurality of RFID tags 3 are collected, an electromagnetic wave from the main antenna 2 of the reader/writer 1 disposed on the ceiling of the management area 5 is radiated at timing of carrying in articles for example, and based on the electromagnetic wave, the reader/writer reads information of the RFID tags 3 to thereby manage the articles.

However, since the antennas of the RFID tags 3 face random directions as described above, it is impossible to cause an electromagnetic wave radiated from the main antenna 2 of one reader/writer 1 to be received by the antennas of the RFID tags 3 facing random directions.

When the dolly 9 enters the management area 5 where the multiple reflecting plates 4 are arranged in a plurality of stages in up and down, passages of electromagnetic waves arriving from the main antenna 2 to the RFID tags 3 via the reflecting surfaces 4*a* of the reflecting plates 4 are formed in addition to passages of the electromagnetic waves arriving directly from the main antenna 2 to the antennas of the RFID tags 3.

Therefore, in the RFID tags 3 in states of receiving the electromagnetic wave radiated from the main antenna 2 of the reader/writer 1, the direct wave 6 from the reader/writer 1 reaches directly, and bidirectional communications are performed with the electromagnetic wave by using the antennas of the RFID tags 3 and the main antenna 2 of the reader/writer 1. Thereby, the information written in the RFID tag 3 is collected by the reader/writer 1, and is transmitted to the computer terminal 15. The computer terminal 15 provides the information obtained from the reader/writer 1 to the server 17 over the network 16. Based on the information provided from the computer terminal 15, the server 17 manages the articles to which the RFID tags 3 are attached. When the information of article management must be changed or new information must be added, the server 17 transmits the information to the computer terminal 15 over the network 16.

When the computer terminal 15 receives the information from the server 17, it transmits the information to the reader/writer 1. The reader/writer 1 radiates the received information by an electromagnetic wave from the main antenna 2 to the space S. If the corresponding RFID tag 3 directly receives the information from the reader/writer 1 from the main antenna 2, the information is written on the memory of the corresponding RFID tag 3.

If the antennas of the RFID tags 3 are not in postures of receiving the electromagnetic wave from the main antenna 2 of the reader/writer 1, electromagnetic waves (reflected waves 7*a* and 7*b*) from the main antenna 2 of the reader/writer 1 will arrive at the RFID tags $3_1$ and $3_2$ by means of the reflecting surfaces 4*a* of the reflecting plates 4.

To the RFID tags $3_1$ and $3_2$ positioned in an area where the direct wave 6 from the main antenna 2 does not arrive, it is true that the reflected waves 7*a* and 7*b* reflected at the reflecting plates 4 arrive. However, in some cases, the direct wave 6 from the main antenna 2 and the reflected waves 7*a* and 7*b* from the reflecting plates 4 may be made incident, depending on the positions of the RFID tags 3.

As described above, corresponding to the antenna direction of an RFID tag with respect to the radiating direction of the electromagnetic wave from the main antenna 2, the direct wave 6 directly arriving from the main antenna 2 to the RFID tag 3 and the reflected waves 7*a* and 7*b* reflected at the reflecting plates 4 are made incident, whereby interference of electromagnetic waves may be caused between the direct wave 6 and the reflected waves 7*a* and 7*b*. As a result, a state where both of the direct wave and the reflected waves cannot be made incident on the RFID tag effectively is caused. When the phenomenon is caused, the RFID tag cannot decode data signals transmitted by the electromagnetic wave from the antenna, so communications of read/write cannot be made.

To cope with it, a difference is caused by the control unit 8 between the receiving electromagnetic wave levels of the direct wave 6 from the main antenna 2 and the reflected waves 7*a* and 7*b* from the reflecting plate 4 received by the antenna of the RFID tag 3.

Specifically, in RFID tags 3 attached to articles, the antennas of the respective RFID tags face random directions. Accordingly, when the RFID tag 3 is angularly rotated within the management area 5, if the antennas of the RFID tag 3 is a flat antenna, the reception effective area of the flat antenna with respect to the direct wave 6 and the reflected waves 7*a* and 7*b* changes, and receiving electromagnetic wave levels of the direct wave and the reflected waves change respectively. If the antenna of the RFID tag is a dipole antenna or a monopole antenna, the respective reception effective lengths of the RFID tags with respect to the radiating directions of the direct wave 6 and the reflected waves 7*a* and 7*b* change, so the receiving electromagnetic wave levels of the direct wave 6 and the reflected waves 7*a* and 7*b* change, respectively.

When a difference is caused between the receiving electromagnetic wave levels with respect to the direct wave 6 and the reflected waves 7*a* and 7*b* of the antenna of the RFID tag 3, interference between electromagnetic waves is reduced. When the difference between the receiving electromagnetic wave levels with respect to the direct wave 6 and the reflected waves 7*a* and 7*b* becomes the maximum, one of the direct wave 6 and the reflected wave 7*a* and 7*b* is made incident effectively on the antenna of the RFID tag 3.

As described above, when interference between the electromagnetic waves received by the antenna of the RFID tag 3 is reduced, or one of the direct wave 6 and the reflected waves 7*a* and 7*b* is made incident effectively on the antenna of the RFID tag 3, data can be demodulated on the RFID tag 3 side.

Figure 2:
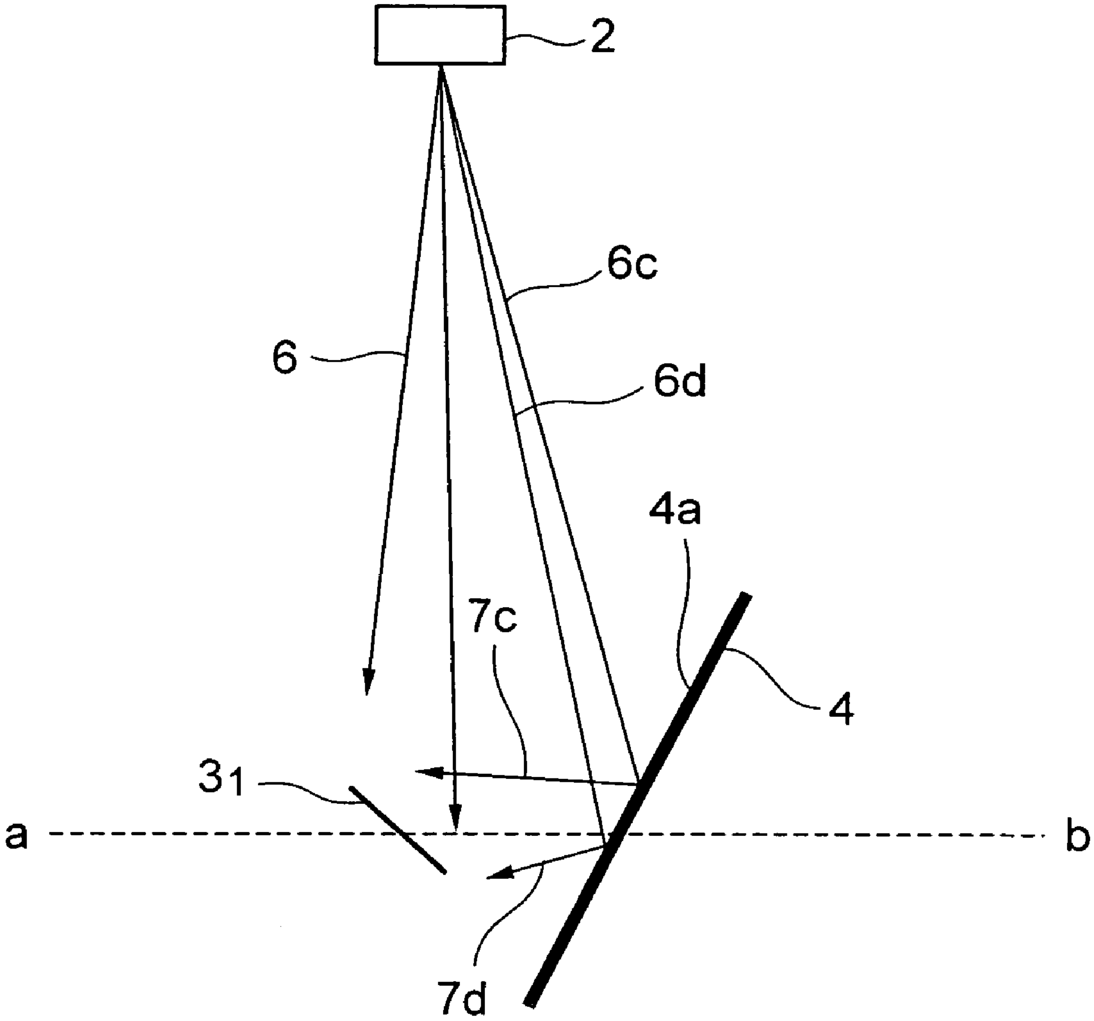
FIG. 2 is a side view showing an RFID tag, facing a reflecting plate, in a state of being tilted 45 degrees upward in the embodiment of the present invention.

Next, a reception effective length, a reception effective area and a difference between receiving electromagnetic wave levels, with respect to an electromagnetic wave from the main antenna 2, of the antenna of the RFID tag 3 will be described based on FIG. 2. FIG. 2 shows a state where the direct wave 6 from the main antenna 2 and the reflected waves 7*c* and 7*d* from the reflecting plates 4 are capable of being made incident on the antenna of the RFID tag $3_1$. Although only the RFID tag $3_1$ in FIG. 1 is described in FIG. 2, this also applies to the RFID tag $3_2$.

As shown in FIG. 2, electromagnetic waves 6, 6*c* and 6*d* from the main antenna 2 are radiated to the RFID tag $3_1$ attached to an article piled up on a dolly 9*a* as the direct wave 6 directly from the main antenna 2 and the reflected waves 7*c* and 7*d* by means of a plurality of reflecting plates 4 from an almost horizontal direction.

The electromagnetic wave level received by the antenna of the RFID tag $3_1$ changes, depending on the passage length of the electromagnetic wave from the main antenna 2 to the antenna of the RFID tag $3_1$, and the reception effective length or the reception effective area of the antenna of the RFID tag $3_1$ with respect to the radiating direction of the direct wave 6 from the main antenna 2 or the radiating direction of the reflected wave from the reflecting plate 4. The reception effective length or the reception effective area of the RFID tag $3_1$ changes due to the antenna direction of the RFID tag $3_1$ with respect to the radiating direction of the direct wave 6 from the main antenna 2 or the radiating direction of the reflected wave from the reflecting plate 4. In a monopole antenna, a dipole antenna or a turnstile antenna, the length of the antenna of the RFID tag $3_1$ viewed from the radiating direction of the electromagnetic wave from the main antenna 2 side is set as a reception effective length, and in a flat antenna, the area of the antenna surface of the RFID tag $3_1$ viewed from the radiating direction of the magnetic wave from the main antenna 2 side is set as a reception effective area. In this case, when the antenna surface of the RFID tag $3_1$ is in vertical to the radiating direction, the reception effective length or the reception effective area becomes the maximum, and the receiving electromagnetic wave level shows the maximum value.

In the example shown in FIG. 2, one passage of the direct wave 6 to the RFID tag $3_1$ and passages of the reflected waves 7*c* and 7*d* via one reflecting plate 4 in an almost horizontal direction to the RFID tag 3 are formed. The antenna surface of the RFID tag $3_1$ faces the reflecting surface 4*a* of the reflecting plate 4 in a state of being tilted 45 degrees with respect to the vertical direction.

(A Case of a Flat Antenna Before Receiving Electromagnetic Wave Level is Adjusted)

In FIG. 2, it is assumed that the antenna of the RFID tag $3_1$ is a flat antenna, and the antenna surface of the flat antenna in the RFID tag $3_1$ faces the direct wave 6 at an angle of about 45 degrees, and the reflecting surface 4*a* of the reflecting plate 4 faces the direct waves 6*c* and 6*d* at an angle of about 45 degrees, and further, the antenna surface of the flat antenna faces the reflected waves 7*c* and 7*d* from the reflecting plate 4 at an angle of about 45 degrees.

The reception effective area of a square, where an edge of the antenna surface of a flat antenna is Acm, is $A^2$ $cm^2$, and when it is tilted by 45 degrees, the reception effective area is changed to $A^2/\sqrt{2}$ $cm^2$. Therefore, the reception effective area of the flat antenna in FIG. 2 becomes $1/\sqrt{2}$ (≈0.7). In this case, when comparing the passages of the direct wave 6 with the reflected waves 7*c* and 7*d* to the flat antenna of the RFID tag $3_1$, the passages of the reflected waves (including direct waves 6*c* and 6*d*) 7*c* and 7*d* via the reflecting plate 4 are slightly longer than the passage of the direct wave 6. Accordingly, there is little difference in the receiving electromagnetic wave levels of the direct wave 6 and the reflected waves 7*c* and 7*d*.

On the other hand, when considered from phases of the electromagnetic waves received by the flat antenna of the RFID tag $3_1$, there is a slight difference between lengths of the passage of the direct wave 6 and the passages of the reflected waves (including direct waves 6*c* and 6*d*) 7*c* and 7*d* via the reflecting plate 4, so a phase shift is caused between the direct wave 6 and the reflected waves 7*c* and 7*d* made incident on the RFID tag surface.

Explanation will be given by using numerical values. Assuming that the frequency of the electromagnetic wave is 2 GHz, one wavelength is 15 cm, and a difference between the passage length of the direct wave 6 and the passage lengths of the reflected waves (including direct waves 6*c* and 6*d*) 7*c* and 7*d* via the reflecting plate 4 is slight. However, when considered from the point of phase, a phase shift is caused between the direct wave 6 and the reflected waves 7*c* and 7*d* made incident on the antenna surface of the RFID tag $3_1$.

Accordingly, the receiving electromagnetic wave levels with respect to the direct wave 6 and the reflected waves 7*c* and 7*d* of the flat antenna in the RFID tag $3_1$ have little difference, and a phase shift is caused between the direct wave 6 and the reflected waves 7*c* and 7*d*, so interference is caused between the direct wave 6 and the reflected waves 7*c* and 7*d*. Therefore, the RFID tag $3_1$ cannot demodulate data signals from the received electromagnetic wave, nor decrypt inquiry signals from the main antenna 2, so the RFID tag $3_1$ will not send a reply signal back, whereby it cannot perform communications with the main antenna 2.

(A Case of Monopole Antenna, Dipole Antenna Before Receiving Electromagnetic Wave Level is Adjusted)

Figure 3:
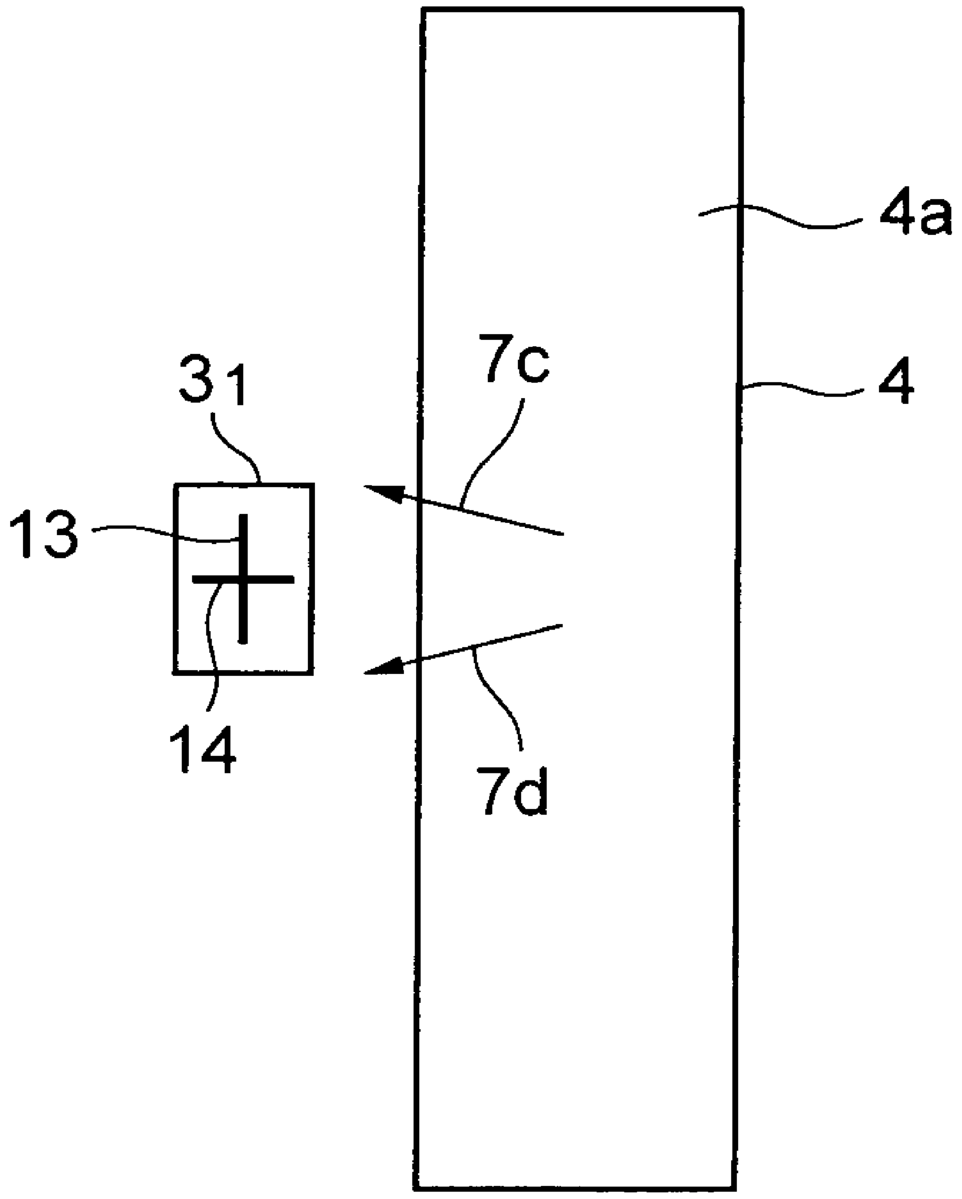
FIG. 3 is a sectional view taken along the line a-b in FIG. 2.

Next, a case where the antenna of the RFID tag $3_1$ is a monopole antenna or a dipole antenna will be described based on FIG. 3. FIG. 3 is a sectional view taken along the line a-b in FIG. 2.

If the antenna of the RFID tag $3_1$ is a monopole antenna or a dipole antenna, when the antenna is in a vertical state 13 as shown in FIG. 3, it faces the direct wave 6 and the reflected waves 7*c* and 7*d* at an angle of almost 45 degrees to each other, and the reception effective length of the antenna with respect to the direct wave 6 and the reflected waves 7*c* and 7*d* is $1/\sqrt{2}$ (≈0.7).

Further, when a monopole antenna or a dipole antenna is in a horizontal state 14 as shown in FIG. 3, it faces the direct wave 6 and the reflected waves 7*c* and 7*d* at an angle of almost 90 degrees, and the reception effective length of the antenna with respect to the direct wave 6 and the reflected waves 7*c* and 7*d* is the full length (≈1).

As described above, there is little difference between the receiving electromagnetic wave levels with respect to the direct wave 6 and the reflected waves 7*c* and 7*d* of the antenna of the RFID tag $3_1$, irrespective of the antenna direction of the RFID tag $3_1$.

On the other hand, when considered from the phases of the electromagnetic waves received by the antenna of the RFID tag $3_1$, there is a slight difference in length between the passage of the direct wave 6 and the passages of the reflected waves (including direct waves 6*c* and 6*d*) 7*c* and 7*d* via the reflecting plate 4, so a phase shift is caused between the direct wave 6 and the reflected waves 7*c* and 7*d* made incident on the antenna surface of the RFID tag $3_1$.

Explanation will be given by using numerical values. Assuming that the frequency of the electromagnetic wave is 2 GHz, one wavelength is 15 cm, and a difference in length between the passage of the direct wave 6 and the passages of the reflected waves (including direct waves 6*c* and 6*d*) 7*c* and 7*d* via the reflecting pate 4 is slight. However, when considered from the point of phase, a phase shift is caused between the direct wave 6 and the reflected waves 7*c* and 7*d* made incident on the RFID tag surface.

Accordingly, there is little difference between the receiving electromagnetic wave levels with respect to the direct wave 6 and the reflected waves 7*c* and 7*d* of the flat antenna in the RFID tag $3_1$, and a phase shift is caused between the direct wave 6 and the reflected waves 7*c* and 7*d*. Therefore, the RFID tag $3_1$ cannot demodulate data signals from the received electromagnetic wave, nor cannot decrypt inquiry signals from the main antenna 2, so the RFID tag $3_1$ will not send back a reply signal, whereby it cannot perform communications with the main antenna 2.

Figure 4:
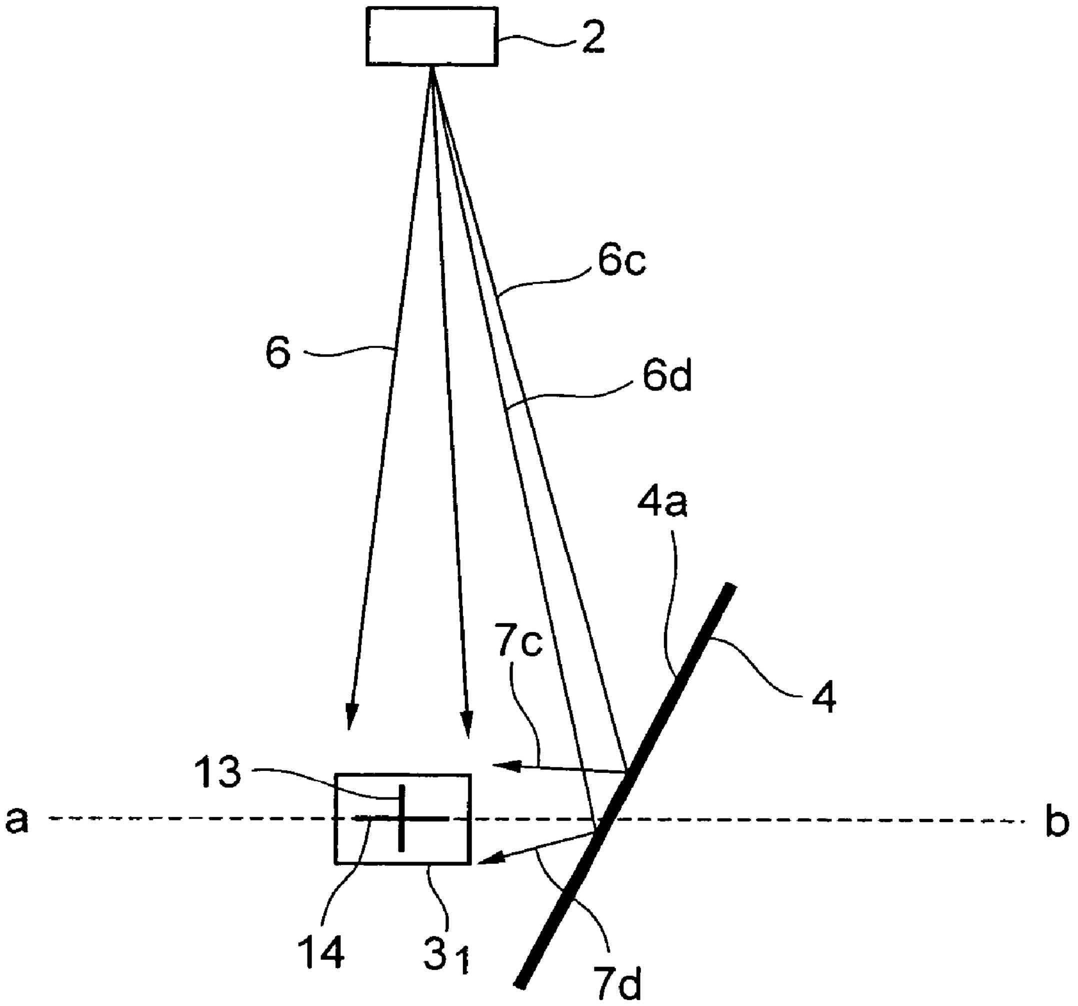
FIG. 4 is a side view showing a state where the RFID tag is turned 90 degrees in a clockwise direction from the state shown in FIG. 2.
Figure 5:
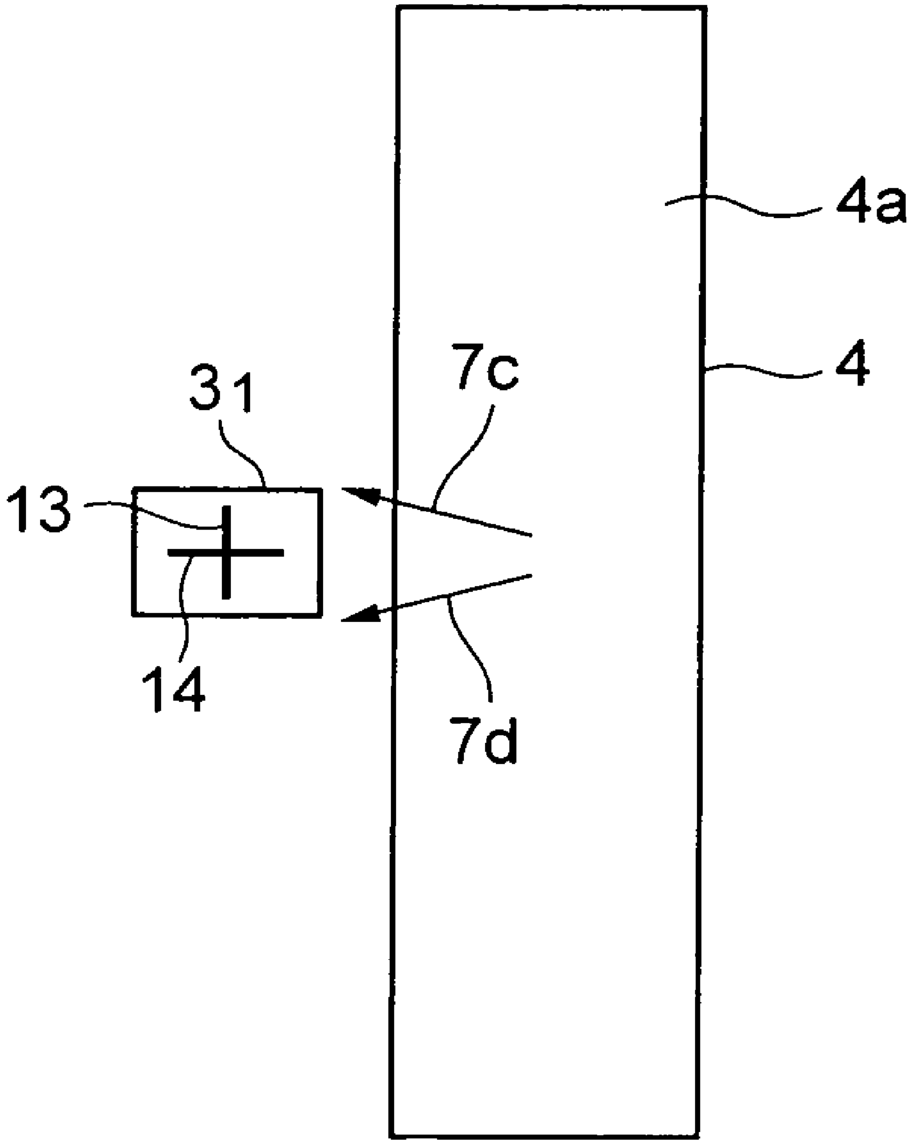
FIG. 5 is a sectional view taken along the line a-b in FIG. 4.

In view of the above, in the present embodiment, a difference is caused in the receiving electromagnetic wave levels by the control unit 8. Specifically, the top plate 9*b* of the vehicle body 9*a* in the management area 5 is angularly rotated by the driving source 10 to thereby change the antenna direction of the RFID tag $3_1$ with respect to the direct wave 6 and the reflected waves 7*c* and 7*d*. FIG. 4 shows a state where the top plate 9*b* is angularly rotated 90 degrees by the driving source 10. FIG. 5 is a sectional view taken along the line a-b in FIG. 4.

During the top plate 9*b* being angularly rotated 90 degrees, inquiry signals (circularly polarized electromagnetic waves) are outputted continuously from the main antenna 2. When the top plate 9*b* is angularly rotated 90 degrees as shown in FIG. 4, the RFID tag $3_1$ is turned 90 degrees in a clockwise direction from the state shown in FIG. 2.

(A Case of Flat Antenna After Receiving Electromagnetic Wave Level is Adjusted)

The reception effective area with respect to the direct wave 6 of a flat antenna seldom changes, and is 1/√2 (;0.7). On the other hand, the antenna direction of the RFID tag $3_1$ becomes parallel to the radiating direction of the reflected waves 7*c* and 7*d*, so the reception effective area with respect to the reflected wave 7 becomes almost zero (;0).

As described above, since a difference is caused between the receiving electromagnetic wave levels with respect to the direct wave 6 and the reflected waves 7*c* and 7*d* of the flat antenna of the RFID tag $3_1$ with an operation of the control unit 8, interference between the electromagnetic waves of the direct wave 6 and the reflected waves 7*c* and 7*d* is reduced even though a phase shift is caused between the direct wave 6 and the reflected waves 7*c* and 7*d* on the antenna surface of the flat antenna. Therefore, the RFID tag $3_1$ can demodulate data signals from the direct wave 6. By turning the antenna direction at least 90 degrees, it is possible to demodulate data signals from the received electromagnetic wave, and to decrypt inquiry signals from the main antenna 2.

(A Case of Monopole Antenna or Dipole Antenna After Receiving Electromagnetic Wave Level is Adjusted)

If the antenna of the RFID tag $3_1$ is a monopole antenna or a dipole antenna, when a monopole antenna or a dipole antenna is in a horizontal state 14 as shown in FIG. 5, it faces the direct wave 6 at an angle of almost 90 degrees, and the reception effective length is the full length (≈1). However, it becomes parallel to the radiating direction of the reflected wave 7*c* and 7, and the reception effective length becomes zero (≈0). When the antenna is in a vertical state 13, it faces the direct wave 6 at an angle of almost 45 degrees, and the reception effective length is 1/√2 (≈0.7). However, it faces the reflected wave 7 at an angle of almost 90 degrees, and the reception effective length is the full length (≈1).

In either state, a difference is caused between the receiving electromagnetic wave levels of the direct wave 6 and the reflected wave 7, so even a phase shift is caused between the direct wave 6 and the reflected waves 7*c* and 7*d* on the antenna surface of the RFID tag 3, interference between the electromagnetic waves is reduced, so the RFID tag $3_1$ can demodulate data signals from the direct wave 6 or the reflected wave 7. By turning the antenna direction at least 90 degrees, it is possible to demodulate data signals from the received electromagnetic wave, and to decode inquiry signals from the main antenna 2.

The results thereof are shown in the table in FIG. 10. FIG. 10 shows a reception effective area or a reception effective length of each antenna in the states shown in FIG. 3 and FIG. 5. A turnstile antenna is a combination of a horizontal state and a vertical state of dipole antennas, and the total value of the both is shown as a reception effective length. In the case where a turnstile antenna is used as the antenna of the RFID tag 3, interference between electromagnetic waves can be determined based on the reception effective lengths, and in the state of FIG. 3, the reception effective lengths have the same value (1.7). Although it is impossible to demodulate data signals from the received electromagnetic wave, by turning the antenna direction of the RFID tag $3_1$ 90 degrees in the clockwise direction, a difference is caused between the reception effective lengths, so data signals can be demodulated.

During the top plate 9*b* of the vehicle body 9*a* being angularly rotated, the main antenna 2 transmits inquiry signals (electromagnetic waves) repeatedly to a plurality of RFID tags $3_1$ piled up three-dimensionally on the vehicle body 9, and performs communications with the replying RFID tags 3 respectively. The computer terminal 15 stores the identification numbers of the RFID tags $3_1$ which replied and with which communications have completed, respectively.

The velocity to angularly rotate the top plate 9*b* of the vehicle body 9*a* is set to a velocity at which a series of communications are possible during the time that the RFID tag $3_1$ decodes inquiry signals from the direct wave 6 or the reflected waves 7*c* and 7*d* and transmits a reply signal responding thereto to the main antenna 2 and then the communications are completed after performing several contacts between the RFID tag 3 and the main antenna 2.

As shown in FIGS. 2 to 5, by turning the RFID tag $3_1$ at least 90 degrees, an effective communication passage using the direct wave 6 or the reflected waves 7*c* and 7*d* is formed between the main antenna 2 and the RFID tag 3 during angular rotation. The RFID tag $3_1$ transmits a reply signal to the main antenna 2, and further, communications are completed after performing several contacts between the RFID tag $3_1$ and the main antenna 2.

Figure 6:
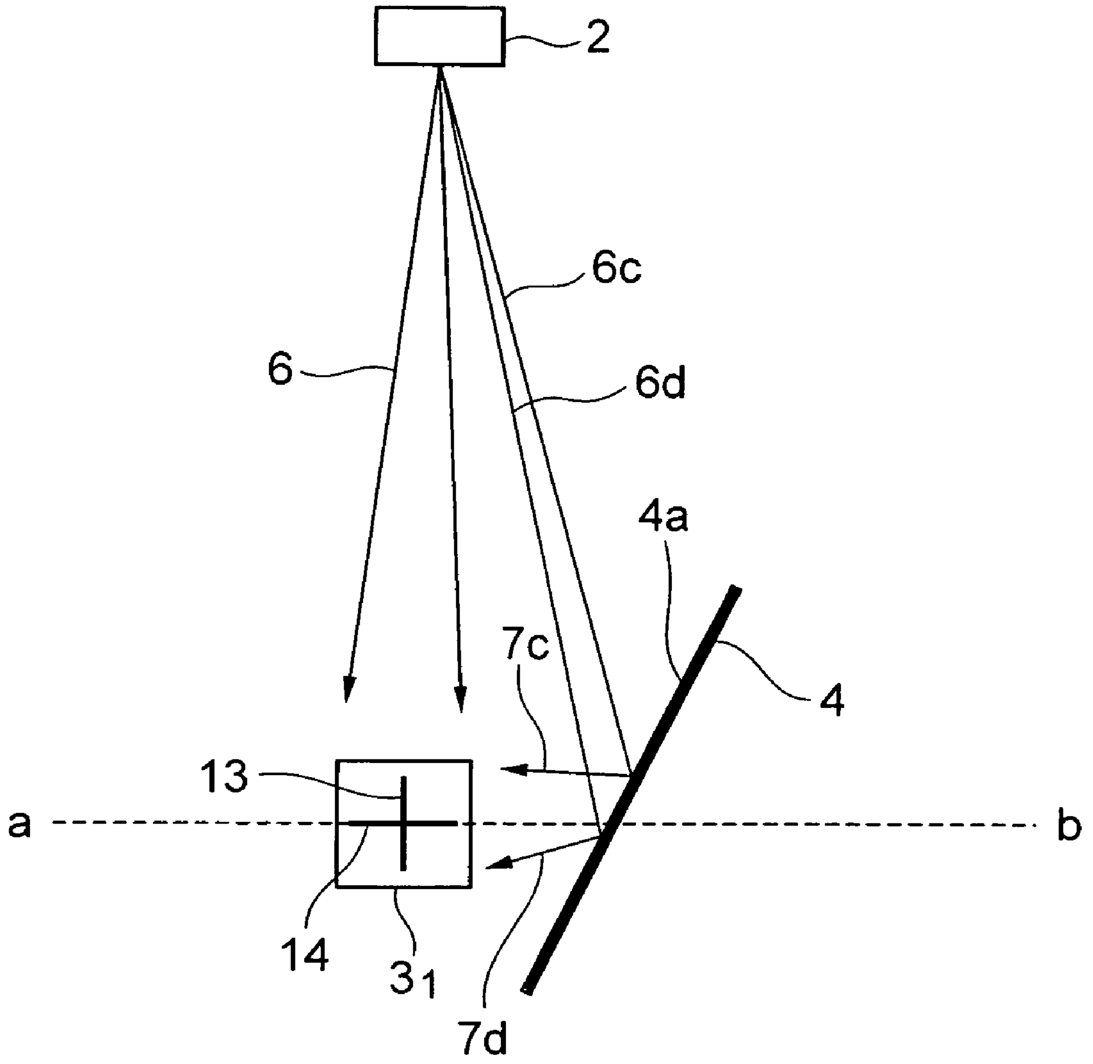
FIG. 6 is a side view showing a state where the antenna surface of the RFID tag is in parallel with the reflecting direction of a direct wave and the reflecting direction of a reflected wave.
Figure 7:
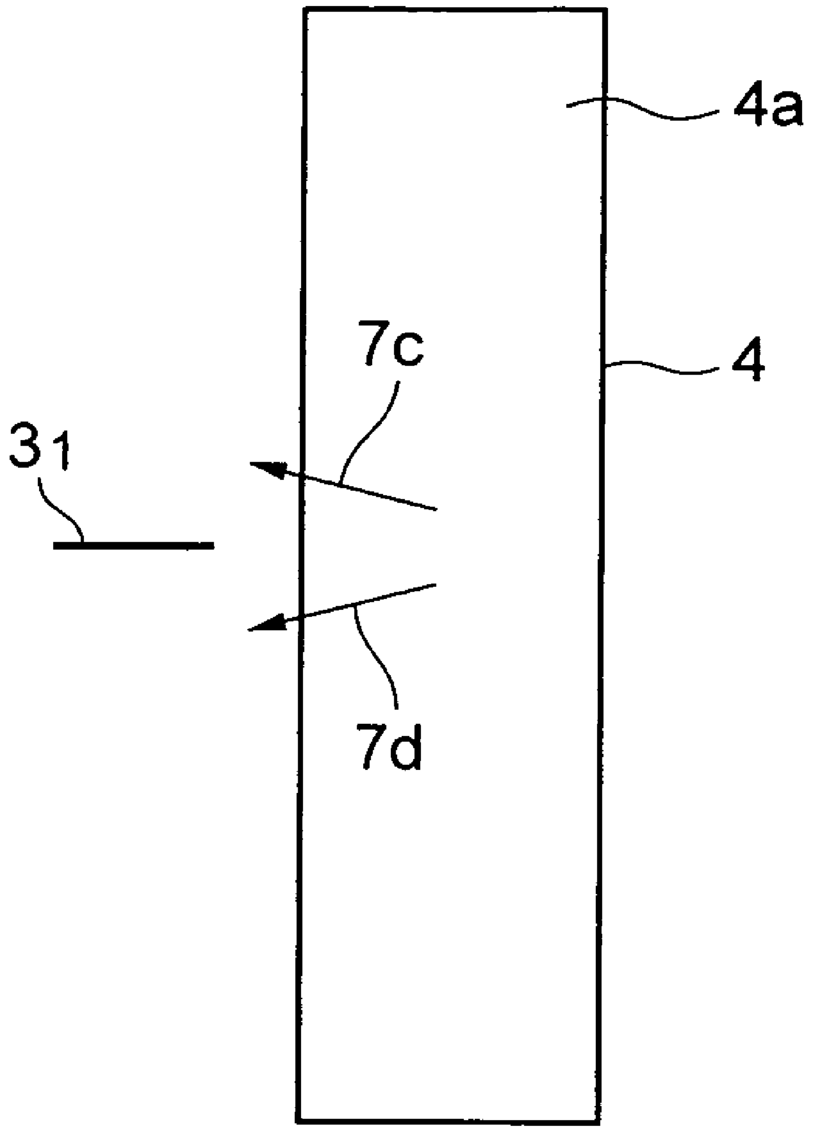
FIG. 7 is a sectional view taken along the line a-b in FIG. 6.

In a state where the RFID tag $3_1$ is in the posture shown in FIG. 6, the antenna surface of the RFID tag $3_1$ is in parallel with the radiating direction of the direct wave 6, and is also in parallel with the radiating direction of the reflected waves 7*c* and 7*d* from the reflecting plate 4 provided almost horizontally with the RFID tag $3_1$. FIG. 7 is a sectional view taken along the line a-b of FIG. 6. Although the RFID tag $3_1$ in FIG. 1 is described, this also applies to RFID tag $3_2$.

(A Case of Flat Antenna Before Receiving Electromagnetic Wave Level is Adjusted)

If a flat antenna is used as the antenna of the RFID tag $3_1$, the antenna surface of the flat antenna is almost in parallel with the direct wave 6 and the reflected waves 7*c* and 7*d*, and the respective reception effective areas become zero (≈0). Therefore, the receiving electromagnetic wave level by the antenna of the RFID tag $3_1$ is low, whereby the RFID tag $3_1$ cannot demodulate data signals from the received electromagnetic wave as described above.

(A Case of Monopole Antenna or Dipole Antenna Before Receiving Electromagnetic Wave Level is Adjusted)

If a monopole antenna or a dipole antenna is used as the antenna of the RFID tag $3_1$, when the antenna is in a horizontal state 14, the reception effective length of the direct wave 6 is the full length (≈1), and the reception effective length with respect to the reflected waves 7*c* and 7*d* is zero (0). When the antenna is in a vertical state 13, the reception effective length with respect to the direct wave 6 is zero (0), and the reception effective length with respect to the reflected waves 7*c* and 7*d* is the full length (≈1). In either state, a difference is caused between the receiving electromagnetic wave levels of the reflected waves and the direct wave, so the RFID tag $3_1$ can demodulate data signals from the received electromagnetic wave as described above.

Figure 8:
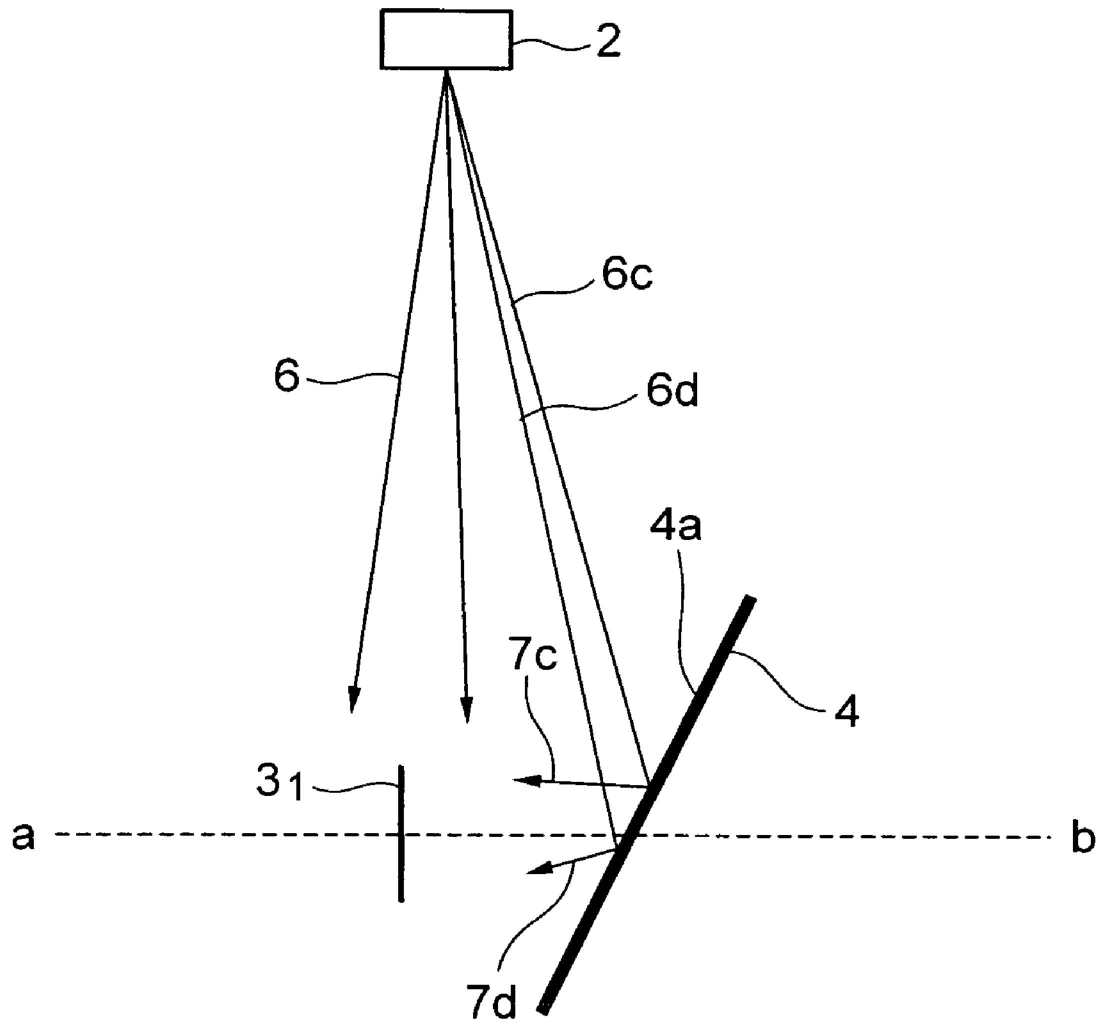
FIG. 8 is a side view showing a state where the RFID tag is turned 90 degrees in a clockwise direction from the state shown in FIG. 6.
Figure 9:
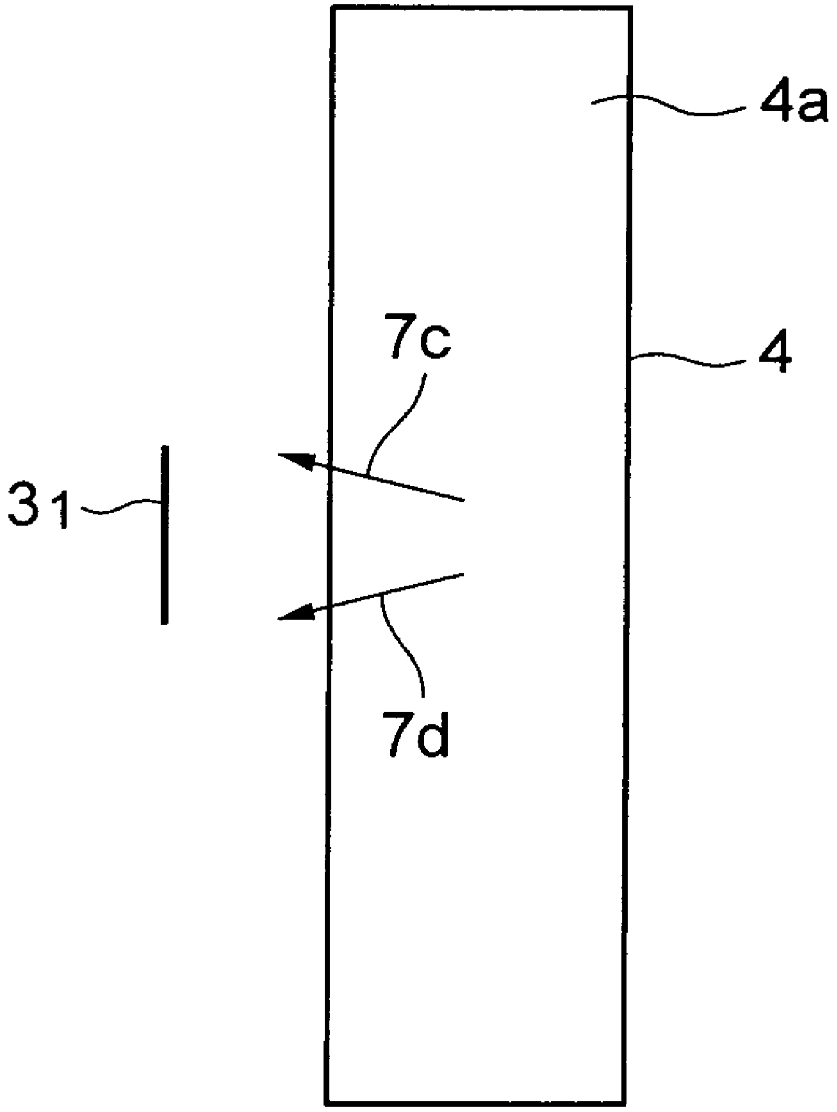
FIG. 9 is a sectional view taken along the line a-b in FIG. 8.

The RFID tag $3_1$ on the vehicle body 9*a* continues angular rotation, and inquiry signals from the main antenna 2 are also transmitted repeatedly. FIG. 8 shows a passage of the direct wave 6 and passages of the reflected waves (including direct waves 6*c* and 6*d*) 7*c* and 7*d* via the reflecting plate 4 to the RFID tag $3_1$ in a state where the RFID tag $3_1$ is turned 90 degrees in a clockwise direction from the state shown in FIG. 6. FIG. 9 is a sectional view taken along the line a-b of FIG. 11.

(A Case of Flat Antenna After Receiving Electromagnetic Wave Level is Adjusted)

If a flat antenna is used as the antenna of the RFID tag $3_1$, the antenna surface of the RFID tag $3_1$ is in parallel with the radiating direction of the direct wave 6, and the reception effective area is zero (≈0), same as the state shown in FIG. 6. However, the antenna surface of the RFID tag $\mathbf{3}_1$ faces vertically to the radiating direction of the reflected waves 7*c* and 7*d*, and the reception effective area with respect to the reflected wave 7*c* and 7*d* is the full face (≈1). The RFID tag $\mathbf{3}_1$ can modulate data signals from the reflected waves 7*c* and 7*d*. By turning the RFID tag $\mathbf{3}_1$ at least 90 degrees, the RFID tag $\mathbf{3}_1$ can demodulate data signals from the received electromagnetic wave.

If a monopole antenna or a dipole antenna is used as the antenna of the RFID tag $\mathbf{3}_1$, when the antenna is in a horizontal state 14, it faces the direct wave 6 at an angle of 90 degrees same as the state shown in FIG. 6, and the reception effective length is the full length (≈1). However, it also faces the radiating direction of the reflected waves 7*c* and 7*d* at an angle of 90 degrees, and the reception effective length is the full length (≈1).

When the antenna is in a vertical state 13, the reception effective length of the direct wave 6 is zero (≈0) same as the state shown in FIG. 6, and the reception effective length of the reflected wave 7 is the full length (≈1). By turning the antenna direction at least 90 degrees, if the antenna is in the horizontal state 14, the receiving electromagnetic wave levels of the direct wave 6 and the reflected waves 7*c* and 7*d* become equal whereby the RFID tag $\mathbf{3}_1$ cannot demodulate data signals from the received electromagnetic wave, but if the antenna is in the vertical state 13, there is no change.

FIG. 11 shows a reception effective area or a reception effective length of each antenna in the states of FIGS. 6 and 8 in a table. Although a turnstile antenna has the reception effective length of the same value (≈1) in the state shown in FIG. 6 so the RFID tag 31 cannot demodulate the data signal from the received electromagnetic wave, when the antenna direction is turned 90 degrees, a difference is caused between the reception effective lengths so the RFID tag $\mathbf{3}_1$ can demodulate data signals.

During the top plate 9*b* of the vehicle body 9*a* being angularly rotated, the main antenna 2 transmits inquiry signals repeatedly to a plurality of RFID tags $\mathbf{3}_1$ piled up three-dimensionally on the vehicle body 9*a*, and performs communications with the replying RFID tags 31, respectively. The computer terminal 15 stores the identification numbers of the RFID tags $\mathbf{3}_1$ which replied and with which communications have been completed, respectively. The velocity to angularly rotate the top plate 9*b* is set to a velocity at which a series of communications are possible during the time that the RFID tag $\mathbf{3}_1$ decodes inquiry signals from the direct wave 6 or the reflected waves 7*c* and 7*d* and transmits a reply signal responding thereto to the main antenna 2 and then the communications are completed after performing several contacts between the RFID tag $\mathbf{3}_1$ and the main antenna 2.

As shown in FIGS. 6 to 9, by turning the RFID tag $\mathbf{3}_1$ at least 90 degrees, an effective communication passage using the direct wave 6 or the reflected wave 7 is formed between the main antenna 2 and the RFID tag 3 during the turn, so the RFID tag $\mathbf{3}_1$ transmits a reply signal to the main antenna 2, and further, communications are completed by performing several contacts between the RFID tag $\mathbf{3}_1$ and the main antenna 2.

As another example of an antenna direction shown in FIGS. 2 to 9, there is a case where the antenna surface of the RFID tag $\mathbf{3}_1$ vertically faces the radiating direction of the direct wave 6, and during angular rotation, the reception effective area of the direct wave 6 is always the full face (≈1) or the reception effective length is always the full length (≈1). Even in this case, during the turn of 90 degrees of the RFID tag $\mathbf{3}_1$, the reception effective area or the reception effective length with respect to the reflected wave 7 becomes not more than 1, so the RFID tag $\mathbf{3}_1$ can demodulate data signals from the received electromagnetic wave.

By turning the antenna direction at least 90 degrees, a difference is caused between the receiving electromagnetic wave levels of the direct wave 6 and the reflected wave 7 of the RFID tag $\mathbf{3}_1$ piled up three-dimensionally on the dolly 9 during the turn, so data signals can be demodulated. The computer terminal 15 determines that communications have made with all RFID tags $\mathbf{3}_1$ on the dolly 9, so it stops transmission of inquiry signals. At the same time, the computer terminal 15 stops rotation of the turntable 10 or 12, so the dolly starts traveling through a passage or a production line 5.

When the dolly travels a passage or a production line and comes to a corner of the square reflecting plate 4 provided on a side or on both sides, the top plate 9*b* of the vehicle body 9*a* may start turning. At the same time, the main antenna 2 provided above starts transmission of inquiry signals. During the dolly 9 passing through the side of the reflecting plate 4, the main antenna 2 transmits inquiry signals repeatedly, and performs communications with replying RFID tags $\mathbf{3}_1$. The computer terminal 15 stores the identification numbers of the RFID tags $\mathbf{3}_1$ which replied and with which communications have been completed, respectively.

Embodiment 2

Figure 12:
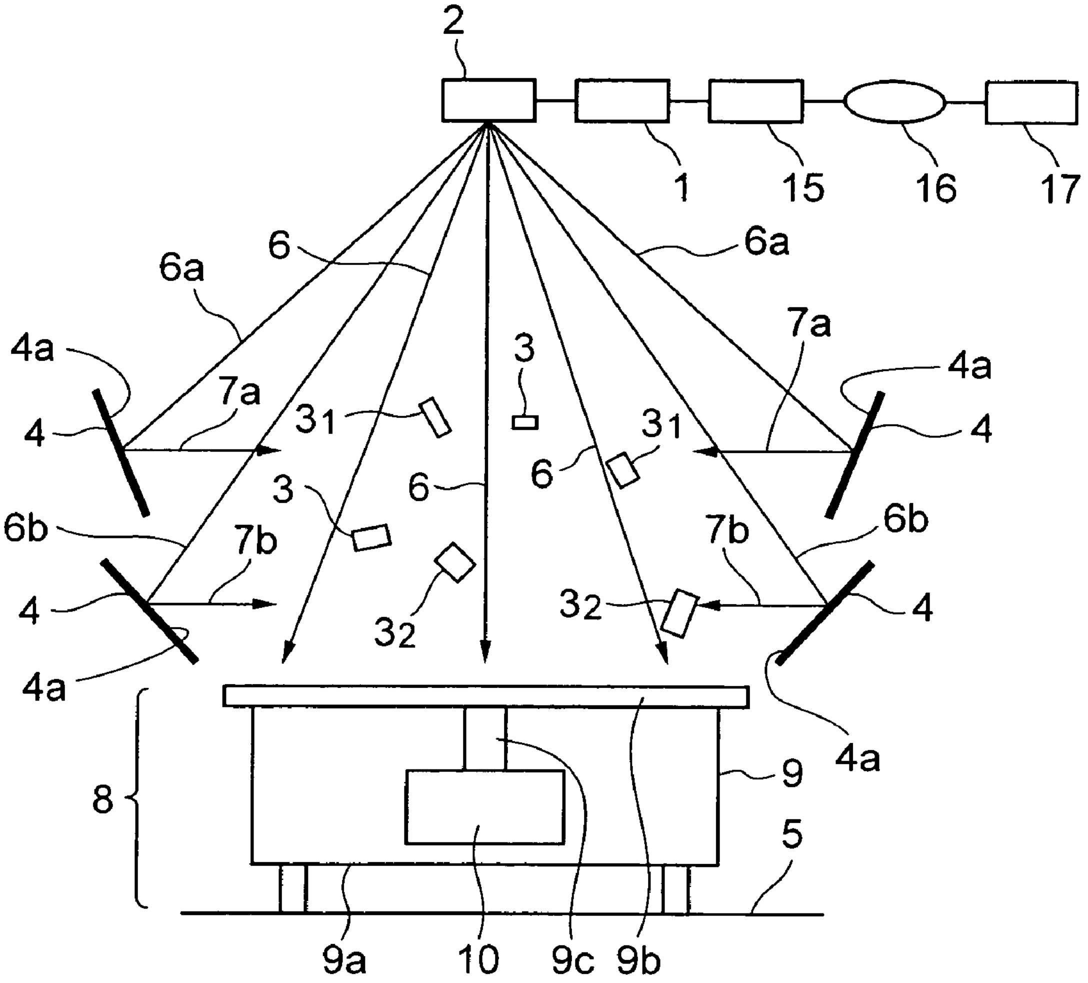
FIG. 12 is a configuration diagram showing a wireless communication system according to an embodiment 2 of the present invention.

FIG. 12 is a configuration diagram showing a wireless communication system according to an embodiment 2 of the present invention. In the embodiment of the present invention, the reflecting plates 4 shown in FIG. 1 are arranged so as to surround the management area 5. That is, a plurality of reflecting plates 4 are divided in two sets, and the respective sets of reflecting plates 4 are placed on opposite walls of a store or a factory or on opposite sides over a passage of a store or a production line of a factory by using fittings or the like so as to be arranged to surround the management area 5. Alternatively, a plurality of reflecting plates 4 may be hanged on both sides almost vertically from fittings or the like with ropes or the like.

A plurality of reflecting plates 4 on both walls or on both sides are mounted in an inclined manner so as to reflect the electromagnetic waves 6*a* and 6*b* from the main antenna 2 to thereby radiate the reflected waves 7*a* and 7*b* horizontally or almost horizontally. To the RFID tags 3 piled up three-dimensionally, the direct electromagnetic wave 6 is radiated from the main antenna 2 from above, and to the RFID tags $\mathbf{3}_1$ and $\mathbf{3}_2$, the reflected waves 7*a* and 7*b* are radiated from the reflecting plates 4 arranged horizontally on the both sides.

According to the present embodiment, the reflected waves 7*a* and 7*b* reflected at the reflecting surfaces 4*a* of the reflecting plates 4 travel from a plurality of directions to the RFID tags $\mathbf{3}_1$ and $\mathbf{3}_2$ piled up three-dimensionally on the vehicle body 9*a*, so it is possible to securely radiate the reflected waves 7*a* and 7*b* to the RFID tags $\mathbf{3}_1$ and $\mathbf{3}_2$. Further, with the reflected wave 7*a* or 7*b* from either of the reflecting plates 4, it is possible to perform communications with the RFID tags 3, $\mathbf{3}_1$ and $\mathbf{3}_2$ in a wide range or communications at a low electromagnetic wave level. Further, in the case where the management area 5 is formed in a part of a passage of a store or a production line of a factory, at the time that the vehicle body 9*a* reaches below the main antenna 2, the articles and the RFID tags 3, $\mathbf{3}_1$ and $\mathbf{3}_2$ attached to the articles on the top plate 9*b* are angularly rotated to thereby suppress interference between the electromagnetic waves of the direct wave 6 and the reflected waves 7*a* and 7*b* on the antenna surfaces of the RFID tags.

In the RFID tags 3 at positions where the passages from the reflecting plates 4 on both sides are equal, the receiving electromagnetic wave levels with respect to the reflected waves from the reflecting plates 4 on both sides are equal, whereby interference may be caused between the electromagnetic waves. However, in the present embodiment, since the antenna surfaces of the RFID tags become in parallel with the radiating direction of the reflected waves 7*a* and 7*b* during angular rotation of at least 90 degrees and the like, the receiving electromagnetic wave levels of the respective reflected waves 7 are changed to thereby reduce interference between the electromagnetic waves, so it is possible to securely perform communications with the RFID tags 3.

Note that in the embodiment shown in FIG. 12, the function that the direct wave 6 from the main antenna 2 and the reflected waves 7*a* and 7*b* from the reflecting plates 4 are received by the RFID tags 3, $\mathbf{3}_1$ and $\mathbf{3}_2$ respectively and a difference is caused between the receiving electromagnetic wave levels with respect to the direct wave 6 and the reflected waves 7*a* and 7*b* on the antenna surfaces of the RFID tags 3, $\mathbf{3}_1$ and $\mathbf{3}_2$ by the control unit 8, is carried out in the same manner as that of the embodiment 1.

Embodiment 3

Figure 13:
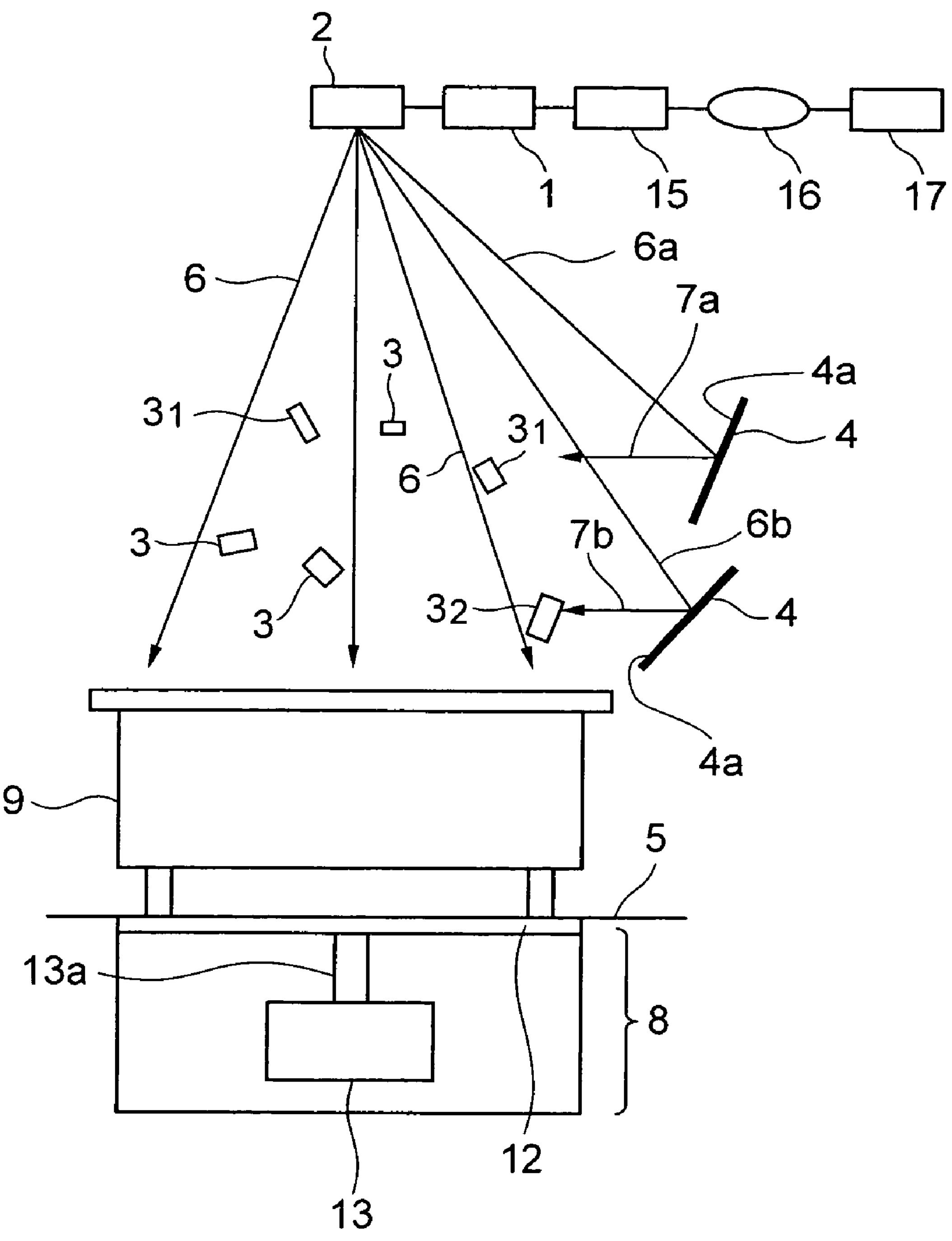
FIG. 13 is a side view showing a wireless communication system according to an embodiment 3 of the present invention.

FIG. 13 is a configuration diagram showing a wireless communication system according to an embodiment 3 of the present invention. Although the control unit 8 is formed of the dolly 8 in the embodiments described above, in the present embodiment, the control unit 8 is formed separately from the dolly 9.

As shown in FIG. 13, the turntable 12 to be rotated with the dolly 9 mounted thereon and a driving source 13 which angularly rotates the turntable 12 are provided under the management area 5, and the output shaft 13*a* of the driving source 13 is linked to the turntable 12. The turntable 12 and the driving source 13 constitute the control unit 8. On a side of the turntable 12, a plurality of reflecting plates 4 are provided by using fittings or the like in an almost vertical direction sandwiching the management area 5. Alternatively, a plurality of reflecting plates 4 may be hanged on a side by ropes or the like from fittings or the like almost vertically. When the dolly 9 passing through the management area 5 gets on the turntable 12 provided below the main antenna 2, the dolly 9 and the articles piled up thereon and the RFID tags 3 attached to the articles start rotating.

When the driving source 13 angularly rotates the turntable 12, the dolly 9 supported by the turntable 12 angularly rotates, and during the dolly 9 is angularly rotating, the main antenna 2 transmits inquiry signals repeatedly to the RFID tags 3, $\mathbf{3}_1$ and $\mathbf{3}_2$ piled up three-dimensionally on the dolly 9, and performs communications with the replying RFID tags 3, $\mathbf{3}_1$ and $\mathbf{3}_2$, respectively. The computer terminal 15 stores the identification numbers of the RFID tags 3, $\mathbf{3}_1$ and $\mathbf{3}_2$ which replied and with which communications have been completed. The velocity to angularly rotate the top plate 9*b* is set to a velocity at which a series of communications are possible during the time that the RFID tags $\mathbf{3}_1$ decodes inquiry signals from the direct wave 6 or the reflected waves 7*c* and 7*d*, and the RFID tags 3, $\mathbf{3}_1$ and $\mathbf{3}_2$ transmit reply signals to the main antenna 2, and then communications are completed by performing several contacts between the RFID tags 3, $\mathbf{3}_1$ and $\mathbf{3}_2$ and the main antenna 2.

Note that in the embodiment shown in FIG. 12, the function that the direct wave 6 from the main antenna 2 and the reflected waves 7*a* and 7*b* from the reflecting plates 4 are received by the RFID tags 3, $\mathbf{3}_1$ and $\mathbf{3}_2$ respectively and a difference is caused between the receiving electromagnetic wave levels with respect to the direct wave 6 and the reflected waves 7*a* and 7*b* on the antenna surfaces of the RFID tags 3, $\mathbf{3}_1$ and $\mathbf{3}_2$ by the control unit 8, is carried out in the same manner as that of the embodiment 1.

According to the present embodiment, the reflected waves 7*a* and 7*b* reflected at the reflecting surfaces 4*a* of the reflecting plates 4 travel from a plurality of directions to the RFID tags $\mathbf{3}_1$ and $\mathbf{3}_2$ piled up three-dimensionally on the dolly 9, so it is possible to securely radiate the reflected waves 7*a* and 7*b* to the RFID tags $\mathbf{3}_1$ and $\mathbf{3}_2$. Further, in the case where the management area 5 is formed in a part of a passage of a store or a production line of a factory, at the time that the dolly 9 reaches below the main antenna 2, the articles on the dolly 9 and the RFID tags 3, $\mathbf{3}_1$ and $\mathbf{3}_2$ attached to the articles are angularly rotated so as to suppress interference between the electromagnetic waves of the direct wave 6 and the reflected waves 7*a* and 7*b* on the antenna surfaces of the RFID tags.

Further, according to the present embodiment, since the control unit 8 is configured separately from the dolly 9, the configuration of the dolly 9 is not needed to be altered, so the dolly 9 which has been used conventionally can be used as it is. Further, since the control unit 8 is constructed under the management area 5, it is possible to prevent the control unit 8 from causing any trouble in conveyance by the dolly 9 on the management area 5.

Embodiment 4

Figure 14:
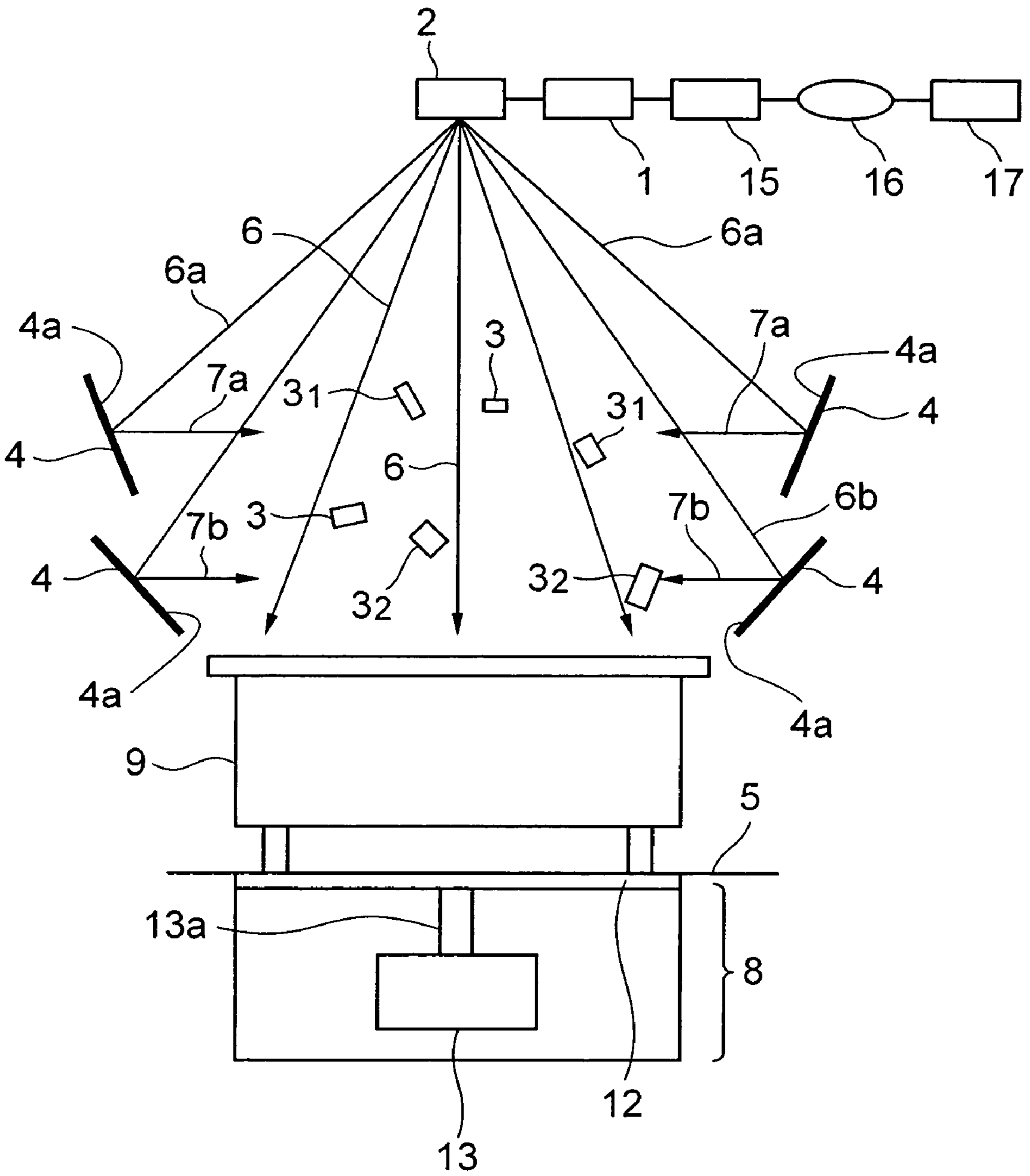
FIG. 14 is a configuration diagram showing a wireless communication system according to an embodiment 4 of the present invention.

FIG. 14 is a configuration diagram showing a wireless communication system according to a fourth embodiment of the present invention. In the present invention, the reflecting plates 4 shown in FIG. 13 are arranged so as to surround the management area 5. That is, a plurality of reflecting plates 4 are divided into two sets, and the respective sets of reflecting plates 4 are placed on opposite walls of a store or a factory or on opposite sides over a passage of a store or a production line of a factory by using fittings or the like so as to be arranged to surround the management area 5. Alternatively, a plurality of reflecting plates 4 may be hanged on both sides almost vertically from fittings or the like with ropes or the like. A plurality of reflecting plates 4 on both walls or on both sides are mounted in an inclined manner so as to reflect the electromagnetic waves 6*a* and 6*b* from the main antenna 2 and to thereby radiate the reflected waves 7*a* and 7*b* horizontally or almost horizontally. To the RFID tags 3 piled up three-dimensionally, the direct electromagnetic wave 6 is radiated from the main antenna 2 from above, and to the RFID tags $\mathbf{3}_1$ and $\mathbf{3}_2$, the reflected waves 7*a* and 7*b* are radiated from the reflecting plates 4 arranged horizontally on the both sides.

According to the present embodiment, the reflected waves 7*a* and 7*b* reflected at the reflecting surfaces 4*a* of the reflecting plates 4 travel from a plurality of directions to the RFID tags $\mathbf{3}_1$ and $\mathbf{3}_2$ piled up three-dimensionally on the dolly 9, so it is possible to securely radiate the reflected waves 7*a* and 7*b* to the RFID tags $\mathbf{3}_1$ and $\mathbf{3}_2$. Further, with the reflected wave 7*a* or 7*b* from either of the reflecting plates 4, it is possible to perform communications with the RFID tags 3, $\mathbf{3}_1$ and $\mathbf{3}_2$ in a wide range or communications at a low electromagnetic wave level. Further, in the case where the management area 5 is formed in a part of a passage of a store or a production line of a factory, at the time when the dolly 9 reaches below the main antenna 2, the articles on the dolly 9 and the RFID tags 3, $\mathbf{3}_1$ and $3_2$ attached thereto are angularly rotated so as to suppress interference between the electromagnetic waves between the direct wave 6 and the reflected waves 7*a* and 7*b* on the antenna surfaces of the RFID tags.

In the RFID tags 3 at positions where the passages from the reflecting plates 4 on the both sides are equal, the receiving electromagnetic wave levels with respect to the reflected waves from the reflecting plates 4 on the both side are equal, whereby interference may be caused between the electromagnetic waves. However, in the present embodiment, since the antenna surfaces of the RFID tags become in parallel with the radiating direction of the reflected waves 7*a* and 7*b* during angular rotation of at least 90 degrees and the like, the receiving electromagnetic wave levels of the respective reflected waves 7 are changed to thereby reduce interference between the electromagnetic waves, so it is possible to securely perform communications with the RFID tags 3.

Note that in the embodiment shown in FIG. 13, the function that the direct wave 6 from the main antenna 2 and the reflected waves 7*a* and 7*b* from the reflecting plates 4 are received by the RFID tags 3, $3_1$ and $3_2$ respectively and a difference is caused between the receiving electromagnetic wave levels with respect to the direct wave 6 and the reflected waves 7*a* and 7*b* on the antenna surfaces of the RFID tags 3, $3_1$ and $3_2$ by the control unit 8, is carried out in the same manner as that of the embodiment 1.

Although the present invention is applied to manage articles in the embodiments described above, the present invention is not limited to this configuration. Wireless IC chips (e.g., RFID tags) may be attached to articles, members or devices transferred through belt conveyers or by dollies so as to manage them. Further, wireless IC chips (e.g., RFID tags) may be attached to articles, members or devices stored in a factory, a warehouse or a distribution channel so as to manage them. Moreover, wireless IC chips (e.g., RFID tags) may be held by or attached to humans or animals to thereby apply the present invention in recognizing the humans or individuals, or in managing entrance and exit.

As described above, according to the present invention, it is possible to prevent interference between a direct wave and a reflected wave, and to effectively make one of the direct wave and the reflected wave incident on the antenna surface, irrespective of distances between wireless IC chips attached to a plurality of articles piled up three-dimensionally and a main antenna, or directions of the antenna surfaces of wireless IC chips with respect to the radiating directions of electromagnetic waves. Therefore, wireless communications can be performed securely.

What is claimed is:

1. A wireless communication system comprising:

a main antenna for radiating an electromagnetic wave from an almost vertical direction with respect to a top plate on which a wireless IC chip is mounted;

a driving source for angularly rotating the top plate in such a manner that a rotating axis direction is to be the almost vertical direction; and reflecting plates, arranged under the main antenna, on both sides that sandwich an area radiated by the electromagnetic wave from the main antenna, for reflecting the electromagnetic wave from the main antenna to radiate the reflected electromagnetic wave to the wireless IC chip.

2. The wireless communication system, as claimed in claim 1, wherein the reflecting plates are mounted in an inclined manner so as to reflect the electromagnetic wave radiated from the main antenna horizontally or almost horizontally with respect to the top plate.

3. The wireless communication system, as claimed in claim 1, wherein the reflecting plates are arranged in a vertical direction depending on a piled height of the wireless IC chip piled up on the top plate.

4. The wireless communication system, as claimed in claim 1, wherein a width of a reflecting surface of the reflecting plates is set to be not less than a wavelength of the electromagnetic wave radiated from the main antenna.

5. The wireless communication system, as claimed in claim 1, wherein the main antenna is attached to a ceiling of a storage room within which the wireless IC chip is disposed, and wherein the reflecting plates are attached to a side wall of the storage room.

6. The wireless communication system as claimed in claim 1, further comprising a control unit for angularly rotating the top plate by at least 90 degrees.

7. A wireless communication method comprising the steps of:

radiating an electromagnetic wave to a wireless IC chip from a main antenna in an almost vertical direction with respect to a top plate on which the wireless IC chip is mounted;

reflecting the electromagnetic wave from the main antenna with reflecting plates arranged on sides that sandwich an area radiated by the electromagnetic wave to radiate the reflected wave to the wireless IC chip; and radiating the electromagnetic wave and the reflected wave to the wireless IC chip by angularly rotating the top plate in such a manner that a rotating axis direction is to be the almost vertical direction.

8. The wireless communication method, as claimed in claim 7, wherein the reflecting plates are horizontal or almost horizontal with respect to the top plate.

9. The wireless communication method, as claimed in claim 7, wherein the reflecting plates are arranged in a vertical direction depending on a piled height of the wireless IC chip piled up on the top plate.

10. The wireless communication method, as claimed in claim 7, wherein a width of a reflecting surface of the reflecting plates is set to be not less than a wavelength of the electromagnetic wave radiated from the main antenna.

11. The wireless communication method, as claimed in claim 7, wherein the main antenna is attached to a ceiling of a storage room within which the wireless IC chip is disposed, and wherein the reflecting plates are attached to a side wall of the storage room.

* * * * *